United States Patent [19]
Ohmura

[11] Patent Number: 6,067,743
[45] Date of Patent: May 30, 2000

[54] LINE GUIDE FOR FISHING ROD

[75] Inventor: Ryuichi Ohmura, Shizuoka, Japan

[73] Assignee: Fuji Kogyo Co., Ltd., Shizuoka, Japan

[21] Appl. No.: 08/967,540

[22] Filed: Nov. 12, 1997

[30] Foreign Application Priority Data

| Nov. 12, 1996 | [JP] | Japan | 8-337408 |
| Nov. 12, 1996 | [JP] | Japan | 8-337409 |
| Nov. 12, 1996 | [JP] | Japan | 8-337410 |
| Nov. 12, 1996 | [JP] | Japan | 8-337411 |
| Nov. 12, 1996 | [JP] | Japan | 8-337413 |

[51] Int. Cl.[7] .................................................. A01K 87/04
[52] U.S. Cl. ............................................. 43/24; D22/143
[58] Field of Search ................................ 43/24; D22/139, D22/143; D26/138

[56] References Cited

U.S. PATENT DOCUMENTS

| 2,360,802 | 10/1944 | Stenz | 43/24 |
| 2,561,675 | 7/1951 | Ross | 43/24 |
| 4,141,132 | 2/1979 | Ohmura | 43/24 |
| 4,196,537 | 4/1980 | Ohmura | 43/24 |
| 4,445,293 | 5/1984 | Ohmura | 43/24 |
| 4,616,438 | 10/1986 | Ohmura | 43/24 |
| 4,682,439 | 7/1987 | Inoue | 43/24 |
| 5,177,892 | 1/1993 | Ohmura | 43/24 |
| 5,383,300 | 1/1995 | Stotesbury | 43/24 |
| 5,802,759 | 9/1998 | Ohmura | 43/24 |
| 5,855,084 | 1/1999 | Huddleston | 43/24 |

FOREIGN PATENT DOCUMENTS

| 7459 | of 1908 | United Kingdom | 43/24 |
| 2 082 032 | 3/1982 | United Kingdom | 43/24 |

*Primary Examiner*—Kurt Rowan
*Attorney, Agent, or Firm*—Evenson, McKeown, Edwards, & Lenahan, P.L.L.C.

[57] ABSTRACT

In order to facilitate the removal of the line entanglement, a frame is slanted and a guide ring member is formed into an oblong shape, however, if the guide ring member is oblong, a size of a guide ring member is increased, inversely, if a thickness of the guide ring member is decreased as a whole, a radius of curvature at side end portions of an inner circumferential surface of the guide ring member is decreased, the sliding resistance is increased depending upon an angle of the fishing line. Accordingly, a thickness t on the right and left of both side portions 4b extending in a straight line of the oblong guide ring member 4 is smaller than a thickness T of other portions 4a, the contact angle of the fishing line 10 to these portions 4b is kept almost unchanged, thus, there is no adverse affect against the sliding resistance even if these portions 4b are thinned.

6 Claims, 17 Drawing Sheets

LINE GUIDE FOR FISHING ROD

BACKGROUND OF THE INVENTION

The present invention relates to a line guide for a fishing rod, and more particularly to a line guide for a fishing rod, provided with a frame having an oblong ring mounting hole and tilted toward the rod tip end, a mounting portion for being mounted onto a rod body, and an oblong guide ring member fitted in the ring mounting hole.

In general, a line guide to be mounted externally on a fishing rod is composed of a hard guide ring member, a frame supporting the guide ring member in an inserted state, a mounting portion for being mounted onto a fishing rod body, and the like. A fishing line fed from a reel is caused to pass through the guide ring member.

There are many demands for this type line guide. Among these, it is most important that the line guide is light in weight as much as possible and it is possible to easily release the line entanglement.

In order to easily release the line entanglement, it is proposed to largely tilt the frame toward the fishing rod tip end. For instance, the line guide shown in FIG. 30 is described in Japanese Utility Model Laid-Open No. 167765/1986. In this line guide a, a frame c having a ring mounting hole 6 is largely tilted toward the fishing rod tip end, and a guide ring member d is fitted in the ring mounting hole b. And, since the frame c is tilted, an aperture diameter of the guide ring member becomes small in the vertical direction, in order to compensate for this, an oblong guide ring member d is used with its longitudinal length extending in the back and forth directions.

In such a line guide a, by applying a tension to the fishing line e even if the fishing line e entangles around the frame c, the entangled portion is caused to pass forwardly (in the right direction of FIG. 30), sliding from a slant surface f of the frame c through the upper surface of the guide ring member d.

In not only the guide ring member d of the above-described line guide a but also other guide ring members, a cross section, intersecting perpendicularly to the circumferential direction of the guide ring member d, of the line guide for a fishing rod is generally shown in FIG. 31. In this case, a cross-section h perpendicular to the circumferential guide ring member g is in the form of a substantially semi-circle at any position. The guide ring member g is inserted into the ring mounting hole k so that a linear outer surface i of the cross section h is in contact with an inner circumferential edge l of the ring mounting hole k. The other surface than the outer surface i of the cross section h is composed of an arcuate surface forming an inner circumferential surface m of the guide ring member g and another arcuate surface through which the inner circumferential surface m and the outer surface i are continuous to each other to make a side end surface n.

The cross section h of the guide ring member g takes such a shape so that, even if the fishing line caused to pass through the hole of the guide ring member g is brought into contact with the inner circumferential surface m at any angle in a rather wide range, a sliding resistance of the fishing line is as small as possible without the fishing line contacting with the edge portion or the curved surfaces defined by a very small radius of curvature.

When the guide ring member takes an oblong shape, there is a problem that a dimension of the guide ring member is increased to rather increase the weight.

Accordingly, it is possible to take such an approach that an entire thickness of the guide ring member is decreased. However, with such an approach, since a radius of curvature r of the side end surface n of the cross section h of the guide ring member becomes very much small, according to an angle of the fishing line passing through the guide ring member, there is raised a problem that the sliding resistance is increased.

Furthermore, if the guide ring member d takes the oblong shape, since the shrinkage amount upon molding is different between the transverse direction and the longitudinal direction, it is very difficult to ensure a necessary dimensional precision for the guide ring member d.

Accordingly, it is possible to take such an approach that the precision of the dimension of the guide ring member d depends upon the polishing work after molding. However, in the case where the guide ring member d has an oblong shape, it is difficult to determine reference position for the polishing work or the like. Accordingly, it is actually very difficult to polish the semi-circular portions at both end portions in the longer axial direction with precision.

For this reason, there are many cases, as shown in FIG. 32, that the dimension of the molded oblong guide ring member d, in particular, the dimension in the longer axial direction is L which is longer than the longitudinal dimension l of the ring mounting hole b of the frame c or is L' which is smaller than that. The dimensions are not identical.

Accordingly, the productivity of the frame c and the guide ring member d in the product line is worse, or even if the guide ring member d is once inserted into the mounting hole b, there is a problem that the guide ring member d is removed or pulled apart in use.

In particular, when a large load is applied to the guide ring member d when fish is caught or the collision shock is caused when the knots or sinkers are abutted against the guide ring member d, there are cases in which, the guide ring member is unexpectedly removed or pulled apart with ease.

As mentioned above, in general, a line guide to be mounted externally on a fishing rod is composed of a hard guide ring member, a frame supporting the guide ring member in an inserted state, a mounting portion for being mounted onto a fishing rod body, and the like.

A line guide a shown in FIG. 33 is shown in Japanese Utility Model Laid-Open No. 35268/1991. In FIG. 33, reference character c denotes a frame which is formed in a ring by punching a metal plate into an annular shape. The frame c is coupled with a mounting pipe p through a support c' that is integral with the frame c. An annular guide ring member d is pressingly inserted into a hole u of the frame c.

There are many demands on the performance for this type line guide. Among these, such factors are important that the frame is light in weight, its mechanical strength is high, the guide ring member is firmly retained and hardly removed, the guide ring member is hardly cracked and it is easy to release the fishing line entanglement.

One of the approaches for easily releasing the fishing line entanglement is that the oblong guide ring member is largely tilted toward the fishing rod tip end.

In the above-described line guide a, the guide ring member d is retained simply by pressingly inserted it into the frame c. In addition, the frame c is simply punched out of the metal plate. In comparison with the thickness of the guide ring member d, the area to be pressingly fitted to the frame c only corresponds to the thickness of the frame c. For this reason, there is a problem that the retainment of the guide ring member d is not always ensured.

For this reason, in general, an adhesive is applied between the frame c and the guide ring member d to thereby maintain a mounting strength of the guide ring member d.

However, even if the adhesive is applied, the effective adhesive area only depends upon the thickness of the frame c. There is no insurance that the guide ring member d will be retained.

Furthermore, in the case where the guide ring member d takes an oblong shape, it is rather difficult to realize the high precision of the dimension of each part. It is therefore unexpectedly difficult to firmly retain the guide ring member d only by the press-fitting it into the frame c.

If the press-fitting between the guide ring member d and the frame c is insufficient, there is a fear that, when the strong shock is applied to the guide ring member d to some extent, the guide ring member d would be pulled apart. In particular, when a fishing line is cast or the fishing line is abruptly wound up while the fish is being caught, in the case where any large knots of the fishing line or any loosened part of the fishing line is collided against the guide ring member d, it is likely that the guide ring member d might easily be released or removed.

Accordingly, there is an approach that a flange is provided on the guide ring member d and the flange is engaged with the opening edge portion of the hole u of the frame c from the front side to thereby prevent the guide ring member d from being pulled apart.

However, with such an approach, it is inevitable that the thickness of the guide ring member d is increased. As a result, the amount of exposure of the guide ring member d is increased. Corresponding to this, there is a problem that it is likely that the guide ring member d would be damaged.

As mentioned above and in conjunction with FIG. 31, in general, the cross section perpendicular to the circumferential direction of the guide ring member g is shown in FIG. 31 so that the fishing line e caused to pass through the hole u of the guide ring member g is out of contact with the corner portions. Namely, the above-described cross section h is substantially in the form of a semi-circle, the linear portion i of the cross section h is in contact with the inner circumferential edge l of the ring mounting hole k, and the corner portions n through which the above-described linear portion i of the cross section h and the reminder portion m are continuous with each other are in the form of arcuate shapes having a radius r of curvature.

The mounting of the guide ring member g onto the frame c is carried out so that its engagement condition may be stable. Also, in order to render the fishing line e to be out of contact with the frame c, to some extent, it is inevitable that the mounting is carried out under the condition that the guide ring member g projects from the frame c. In general, as shown in FIG. 31, the mounting is carried out so that the exactly mid-portion of the linear portion i of the cross section h is in contact with the inner circumferential edge l.

For this reason, also in the above-described line guide a, there is a fear that the part projecting from the frame c of the guide ring member g serves as a wall, and the fishing line e that has slid along and on the frame c is hooked on the wall. In particular, in the case where the upper surface of the frame c or the fishing line e is wet (actually wet in fishing), the fishing line e is kept contacting to the frame c. Accordingly, there is a high possibility that the fishing line would be hooked on or around the guide ring member g.

SUMMARY OF THE INVENTION

In view of the above-mentioned defects inherent in the prior arts, a first object of the present invention is to provide a line guide for a fishing rod in which it is possible to reduce a weight of a guide ring member having an oblong shape without increasing a sliding resistance of the fishing line caused by passing through the guide ring member, and the total width may be reduced without any fishing line entanglement.

A second object of the invention is to provide a line guide for a fishing rod in which it is possible to firmly retain, under pressure, the guide ring member at the ring mounting hole of the frame without substantial dimensional precision of the guide ring member having the oblong shape.

A third object of the invention is to provide a line guide for a fishing rod in which the mounting state of the frame to the guide ring member is maintained without fail and it is possible to effectively prevent any damage of the guide ring member.

A fourth object of the present invention is to provide a line guide for a fishing rod in which the mounting state of the frame to the guide ring member is maintained in a very stable manner, and it is possible to effectively prevent any damage of the guide ring member.

A fifth object of the invention is to provide a line guide for a fishing rod in which without damaging the mounting condition of the guide ring member onto the frame, the fishing line is hardly entangled around the projection of the guide ring member.

In order to attain the first object, there is provided a line guide for a fishing rod, comprising a frame tilted toward a tip end of the fishing rod, a mounting portion mounted on the fishing rod, and a guide ring member engaged with a ring mounting hole formed in said frame and having an oblong shape extending back and forth, wherein each width on the right and left sides of said guide ring member is smaller than a width of other portions.

In order to attain the second object, there is provided a line guide for a fishing rod, comprising a frame tilted toward a tip end of the fishing rod, a mounting portion mounted on the fishing rod, and a guide ring member engaged with a ring mounting hole formed in said frame and having an oblong shape extending back and forth, wherein a projection is provided in the range corresponding to a portion extending in a straight line said guide ring member out of an inner circumferential edge of the ring mounting hole, and said guide ring member is press-fitted in the ring mounting hole.

In order to attain the third object, there is provided a line guide for a fishing rod, comprising a frame having a ring mounting hole, a mounting portion mounted on the fishing rod, and a guide ring member engaged with the ring mounting hole, wherein a circumferential wall is formed by bending forwardly an outer circumferential portion of said frame, a flange extending along an outer circumferential surface is provided on said guide ring member, the flange of said guide ring member is engaged with an opening edge portion on a front side of the ring mounting hole, a rear portion of said flange is press-fitted to the ring mounting hole, and end portions of both side portions on the right and left of the circumferential wall is engaged with both side portions on the right and left of said guide ring member.

It is preferable that said frame is tilted toward the tip end of the fishing rod, and said guide ring member is formed into an oblong shape extending back and forth.

In order to attain the fourth object, there is provided a line guide for a fishing rod, comprising a frame having a ring mounting hole, a mounting portion mounted on the fishing rod, and a guide ring member engaged with the ring mounting hole, wherein a circumferential wall is formed by bending forwardly an outer circumferential portion of said frame, a flange extending along an outer circumferential surface is provided on said guide ring member, the flange of said guide ring member is engaged with an opening edge portion on a front side of the ring mounting hole, a rear portion of said flange is press-fitted to the ring mounting hole, and an adhesive is applied between said circumferential wall and said guide ring member.

It is preferable that the frame is tilted toward the tip end of the fishing rod, said guide ring member is formed into an oblong shape extending back and forth, and a distance between inner edges of the circumferential wall is substantially the same as a distance between outer edges of said guide ring member.

In order to attain the fifth object, there is provided a line guide for a fishing rod, comprising a frame having a substantially plate-like shape, a mounting portion mounted on the fishing rod, and a guide ring member engaged with a ring mounting hole formed in said frame, wherein a cross-sectional shape perpendicular to a circumferential direction of said guide ring member is substantially in the form of a semi- circular shape, linear portions of a contour of the cross-section is in contact with an inner circumferential edge of the ring mounting hole, and corners at which the linear portions of the contour of the cross-section and other portions are continuous with each other is substantially in the form of an arcuate shape, characterized in that said frame inwardly bent on a central axis in the longitudinal direction, said guide ring member in which each corner adjacent to the frame is formed as a circular arc depicted around a center on a straight line extending from a face of the frame.

Also, a line guide for a fishing rod according to the present invention, comprises a frame having a substantially plate-like shape, a mounting portion mounted on the fishing rod, and a guide ring member engaged with a ring mounting hole and formed in said frame, a cross-sectional shape perpendicular to a circumferential direction of said guide ring member being substantially in the form of a semicircular shape, linear portions of a contour of the cross-section being in contact with an inner circumferential edge of the ring mounting hole, and corners at which the linear portions of the contour of the cross-section and other portions are continuous with each other being substantially in the form of an arcuate shape, characterized in that a bump is formed on said frame by pressing a portion between the mounting leg and the ring mounting hole, and a height of said bump is substantially equal to that of said guide ring.

DETAILED DESCRIPTION OF THE PREFERRED EMBODIMENTS

Figure 1:
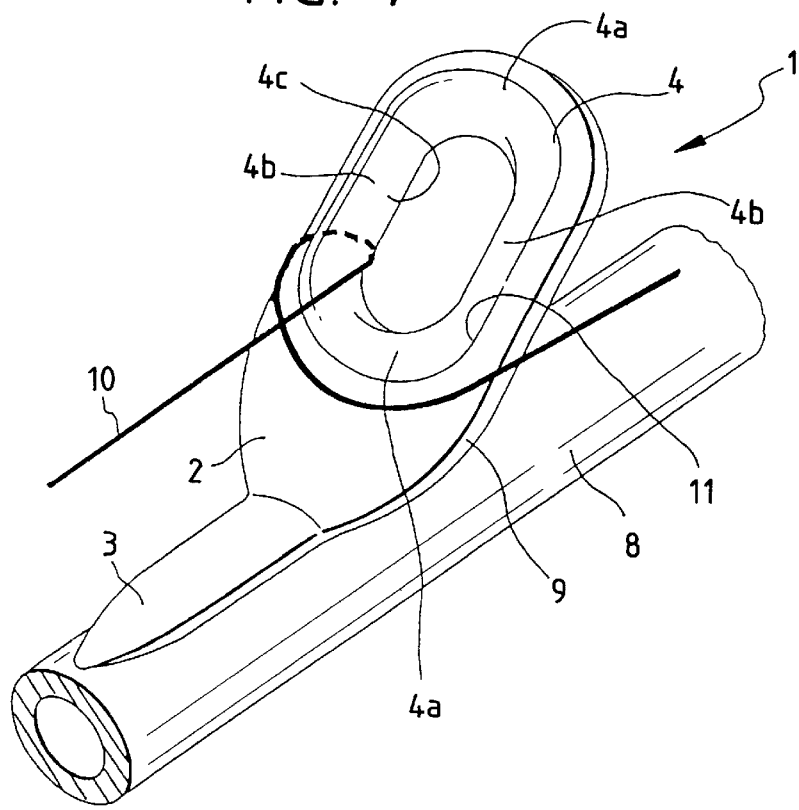
FIG. 1 is an overall perspective view showing a line guide for a fishing rod in accordance with a first example of the invention under the condition that it is mounted on the fishing rod.
Figure 2:
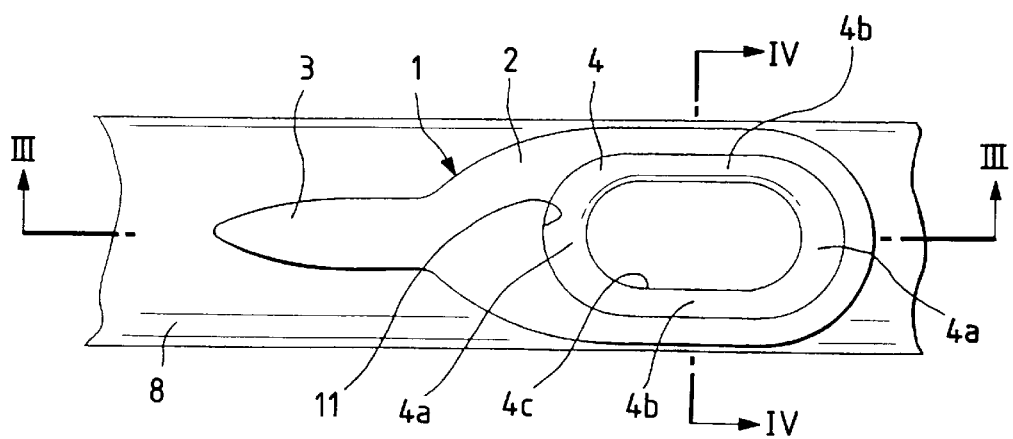
FIG. 2 is a plan view showing a condition that the line guide for the fishing rod shown in FIG. 1 is mounted on the fishing rod.

A line guide for a fishing line according to examples of the present invention will now be described with reference to FIGS. 1 to 29.

EXAMPLE 1

In FIGS. 1 to 4, reference numeral 1 denotes a fishing line guide for a fishing rod. The line guide 1 is composed of a metal made frame 2, a metal made mounting foot 3 and a guide ring member 4 retained on the frame 2.

Figure 3:
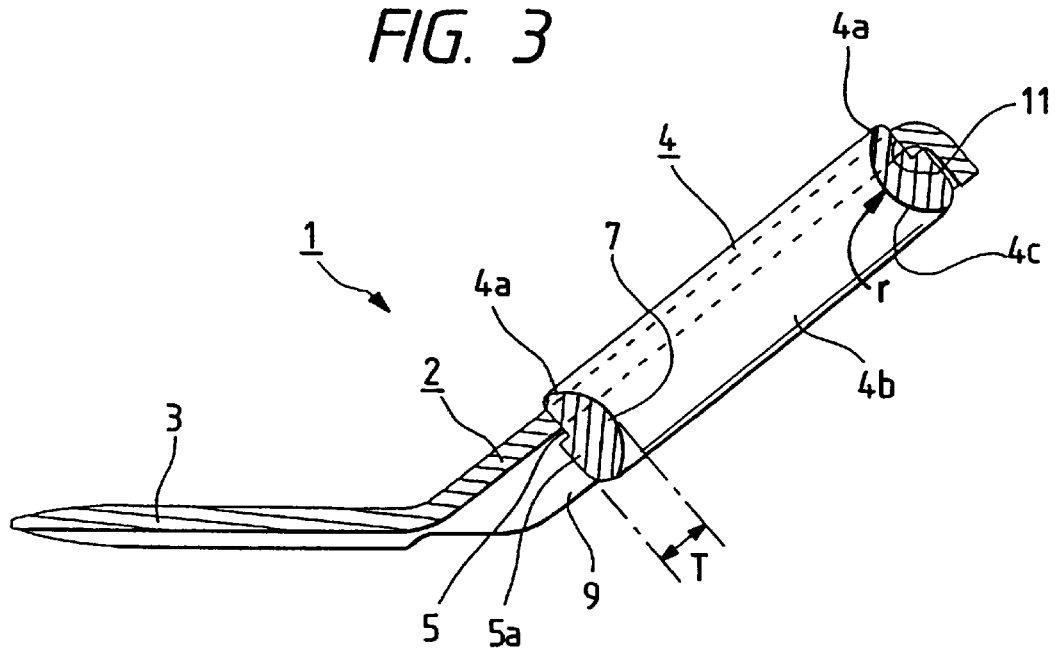
FIG. 3 is a cross-sectional view taken along the line III—III of FIG. 2.
Figure 4:
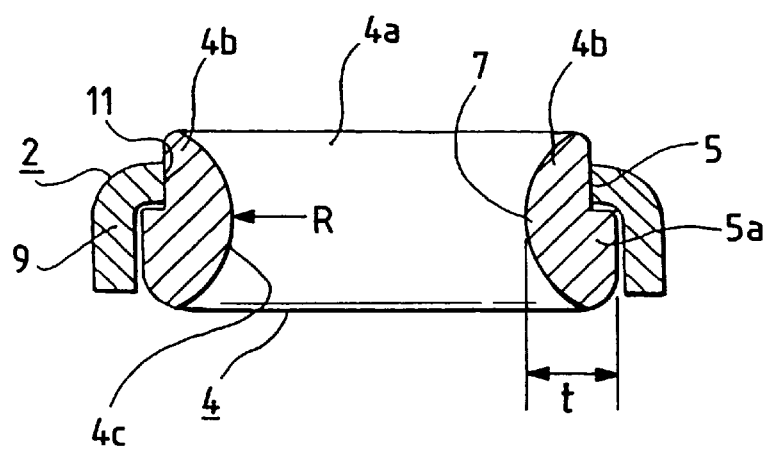
FIG. 4 is an enlarged cross-sectional view taken along the line IV—IV of FIG. 2.

The guide ring member 4 is formed of hard material such as ceramics and takes an oblong shape that is long in the back-and-forth direction. As shown in FIGS. 3 and 4, the guide ring member 4 is in the form of a semi-circular shape in each of front and rear end portions 4a, and intermediate portions 4b extend in a linear shape. A flange portion 5a projecting from each semicircular portion, in the thickness direction, of the outer circumferential surface 5 is formed.

A thickness of t of each intermediate portion 4b (see FIG. 4) is thinner than a thickness T of each of the front and rear end portions 4a (see FIG. 3) (i.e., t<T). The thickness t is about two thirds of the thickness T ($t = \frac{2}{3} \times T$).

In this relationship, although the cross section 7, perpendicular to the circumferential direction, of each of the front and rear end portions 4a is substantially in the form of a semi-circular shape, the corresponding cross section 7 (see FIG. 4) is substantially in the form of a crescent shape. Accordingly, the radius of curvature R (see FIG. 4) of the inner circumferential surface of the intermediate portions 4b is greater than the radius of curvature r (see FIG. 3) of the inner circumferential surface of the front and rear end portions 4a.

The frame 2 and a mounting foot 3 are formed integrally with each other by pressing a metal plate. Under the condition that the mounting foot 3 is seated on the outer circumferential surface of a rod body (sometimes referred to as a "blank") 8, the mounting foot 3 as well as the rod body 8 is bound by a thread so that the line guide 1 is mounted on the rod body 8.

The frame 2 is formed into a substantially oblong shape extending back and forth. The outer circumferential portion except the rear end portion is bent downwardly to form a circumferential wall 9.

Also, the frame 2 is tilted so that it is shifted toward the rod tip end (in the direction from left to right upward in FIG. 1) upwardly. The slant angle is about 40° relative to a flat surface on which the mounting foot 3 is located.

Reference numeral 11 denotes a ring mounting hole formed in the frame 2 and having an oblong shape extending in the longitudinal direction of the frame 2.

The guide ring member 4 is fitted into this ring mounting hole 11. Namely, under the condition that the flange 5a of the guide ring member 4 is engaged with the opening edge portion on the back side of the ring mounting hole 11, the other portion of the guide ring member 4 is fitted into the ring mounting hole 11.

The hole 4c of the guide ring member 4 is substantially in the form of a circle as viewed in the axial direction of the rod body 8. Accordingly, even if the guide ring member 4 takes a slant posture, it is possible to keep a sufficient aperture diameter needed for guiding the fishing line 10 smoothly.

The line guide 1 is constructed as mentioned above.

As mentioned above, since the thickness of the guide ring member 4 is thinner than the thickness of the front and rear end portions 4a in the intermediate portions 4b, in comparison with the case the overall thickness is kept at that of the front and rear end portions 4a, it is possible to decrease the weight by about three fourths.

Also, corresponding to the decrease in thickness of the intermediate portions 4b of the guide ring member 4, the width of the guide ring member 4 on the right and left is decreased, so that the width of the frame 2 on the right and left may be decreased. It is therefore possible to decrease the weight of the frame 2.

Since the decrease in weight of the guide ring member 4 and the frame 2 may be applied to several to more than ten line guides to be mounted on a single fishing rod, it is possible to rather decrease the overall weight of the fishing rod.

The decrease in the thickness is caused by the intermediate portions 4b forming the side portions of the guide ring member 4 on both sides on the right and left. There is almost no fear that the contact angle, with respect to the intermediate portions 4b, of the fishing line 10 to be caused to pass through the guide ring member 4 would be changed. There are many cases where the fishing line 10 is substantially in parallel with the direction of the hole 4c in which the fishing line 10 passes. Accordingly, even if the radius of curvature of the side end portions where the outer circumferential surface 5 and the inner circumferential surface are continuous with each other in the cross section perpendicular to the circumferential direction of the intermediate portions 4b is reduced, there is almost no adverse affect against the sliding resistance of the fishing line 10.

Corresponding to the decrease in the right and left width of the frame 2, the fishing line 10 would hardly be entangled.

Also, as shown in FIG. 1, even if the fishing line 10 is entangled to turn around the frame 2, if a tension is applied to the fishing line 10, the portion wound around the frame 2 slidingly move along and on the frame forwardly to be pulled apart so that it is possible to easily release the line entanglement.

Although the first example of the invention has been described as above, it should be understood that the specific structure of the present invention is not limited to those shown in the example but it is possible to change and choose design within the scope of the spirit of the invention which may be included in the present invention.

In particular, the specific shape of the cross section perpendicular to the circumferential direction of the guide ring member is not limited to that shown in the example.

In the line guide for the fishing rod in accordance with the first example of the present invention, it is possible to decrease the weight of the guide ring member and the frame corresponding to the decrease of the thickness in the widthwise direction of the parts extending in a straight line of the guide ring member in comparison with the thickness of the other portions and the width of the frame on the right and left may be decreased, it is possible to provide a device in which the fishing line entanglement hardly occurs.

Also, the reduction in thickness of the guide ring member depends upon both side portions of the guide ring member. Since the contact angle of the fishing line to these portions is hardly changed, even if these portions are thinned, there is almost no fear of the adverse affect against the sliding resistance of the fishing line.

EXAMPLE 2

Figure 5:
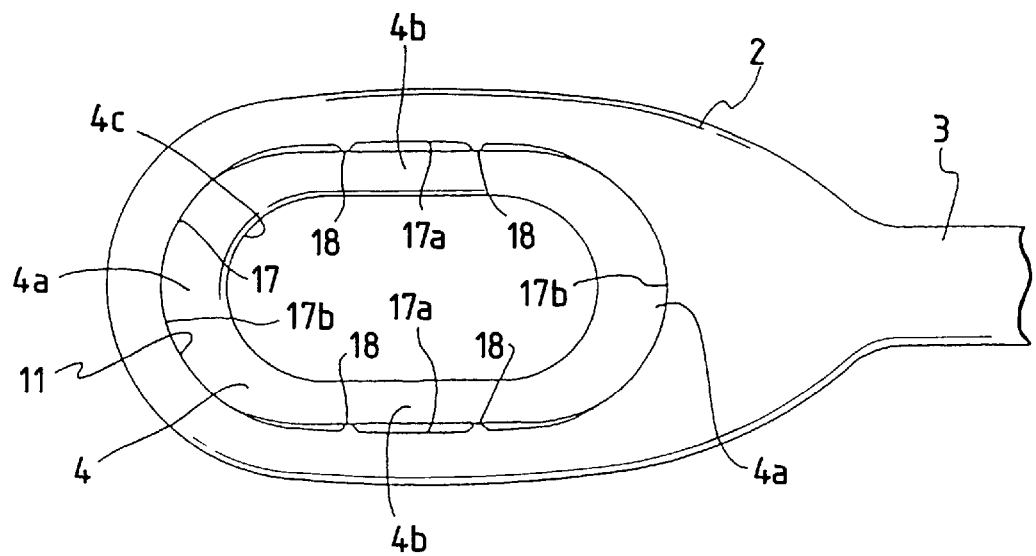
FIG. 5 is a enlarged plan view showing an important part in accordance with a second example of the invention.
Figure 6:
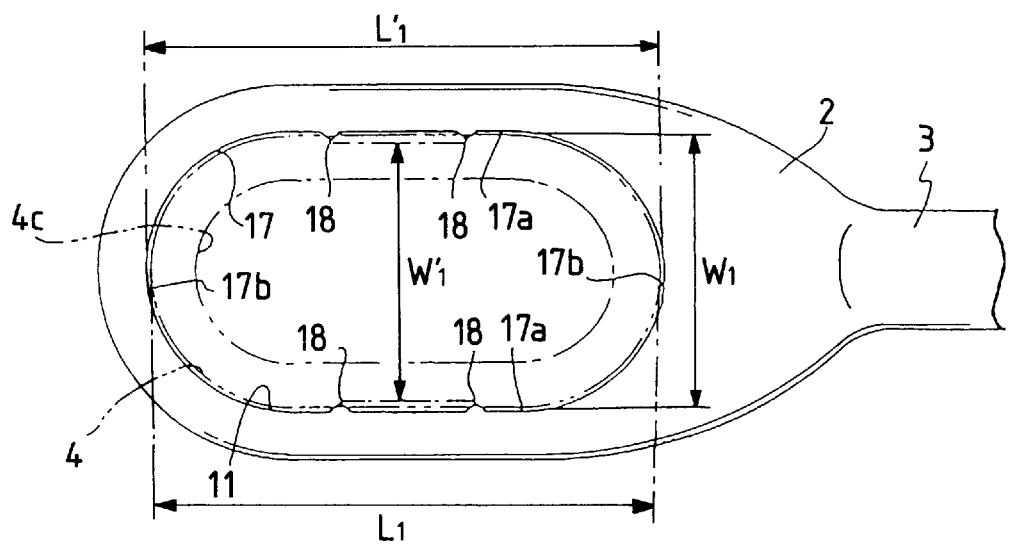
FIG. 6 is a plan view showing only an important part of the frame of the line guide shown in FIG. 5.
Figure 7:
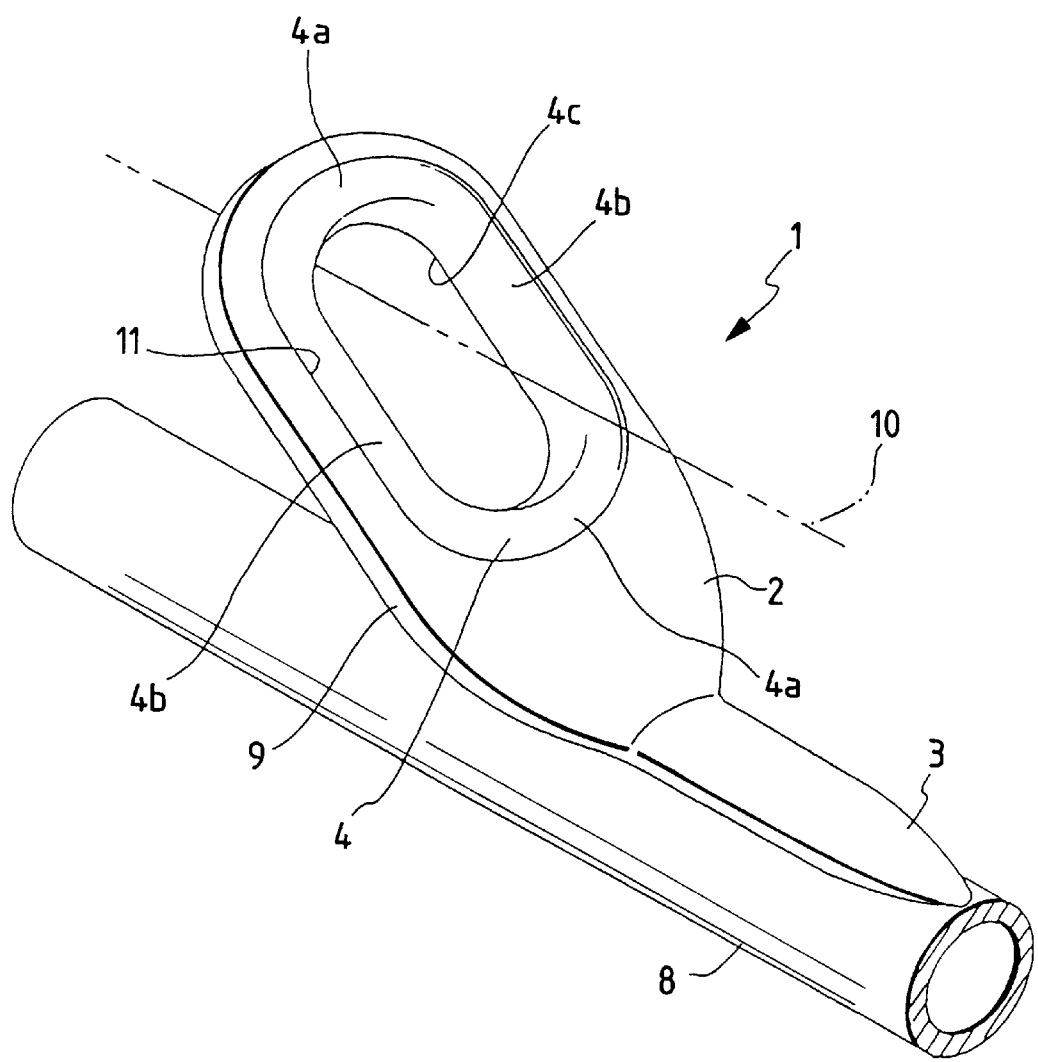
FIG. 7 is a perspective view showing a condition that the line guide is mounted on the fishing rod.

FIGS. 5 to 7 show a line guide for a fishing rod according to a second example of the invention. The line guide 1 is composed of a metal made frame 2, a metal made mounting foot 3 and a guide ring member 4 retained on the frame 2.

The guide ring 4 has an oblong shape extending back and forth. The guide ring member 4 is in the form of a semi-circular shape in each of front and rear end portions 4a, and intermediate portions 4b extend in a linear shape. The longitudinal dimension of the guide ring member 4 is about 1.5 times greater than the short axial dimension.

Also, the cross section perpendicular to the circumferential direction of the guide ring member 4 is substantially in the form of a semi-circular shape in any position and the arcuate surface of the semi-circular shape forms the inner circumferential surface of the guide ring member 4.

Incidentally, the guide ring member 4 is made of hard material such as ceramics.

The frame 2 is slanted so that it is shifted toward the rod tip end (in an upward direction toward the left side in FIG. 7) to form substantially a rectangular shape extending back and forth as viewed in a direction perpendicular to the slant surface so that it reaches the mounting foot 3 while the side edges on the right and left sides curve to form arcuate lines to reduce the width toward the rear end.

Also, both side portions of the frame are bent downwardly, respectively, to form a relatively narrow circumferential wall 5 in the width.

The mounting foot 3 has a width that is about one third of a full width of the frame 2 and extends horizontally rearwardly from the lower end of the frame 2.

The mounting foot 3 and the frame 2 are formed to be integral with each other by pressing a metal plate.

The slant is represented by substantially 40° relative to the flat surface on which the mounting foot 3 is located.

Reference numeral 11 denotes the ring mounting hole formed in the frame 2. This ring mounting hole 11 takes an oblong shape along the longitudinal direction of the frame 2 and essentially similar to the shape of the outer contour of the guide ring member 4.

Reference numeral 17 denotes an inner circumferential edge of the ring mounting hole 11. Reference 17a denotes portions of the above-described inner circumferential edge 17 extending in a straight line. Small projections 18 project from two positions close to both ends of each of the portions 17a. Each projection 18 takes substantially a triangular shape. The projections located on both sides are arranged to face each other.

The dimensional relationship between the guide ring member 4 and the ring mounting hole 11 is as follows (see FIG. 6).

Namely, the full length W1 of the contour of the guide ring member 4 is somewhat greater than a distance $W'_1$, between ends of the right and left projections 18 and 18. Also, the longitudinal dimension L1 of the contour of the guide ring member 4 is somewhat shorter than the longitudinal length L1' of the ring mounting hole 11.

The dimensional precision of each portions including the above-described dimension W1' and L1' of the ring mounting hole 11 may be obtained by the dimension of molds to be used for punching the frame 2.

The dimension for the guide ring member 4 may be obtained by polishing the width W1 after the formation, and setting the negative allowance that is somewhat greater than the longitudinal dimension L1.

Accordingly, if the guide ring member 4 is pressingly inserted into the ring mounting hole 11, the portions of the guide ring members 4 extending in a straight line press the projections 18 substantially widthwise and are received between the right and left projections 18 and 18 to press the projections 18 so that the width of the ring mounting hole 11 is increased. The frame 2 is somewhat deformed to decrease the longitudinal dimension L1' of the ring mounting hole 11. Thus, opposite end portions 17b in the longitudinal direction of the inner circumferential edge 17 of the ring mounting hole 11 are brought into pressing contact with the opposite end portions in the longitudinal direction of the outer circumference surface of the guide ring member 4.

FIG. 5 shows a state in which the guide ring member 4 has been thus inserted into the ring mounting hole 11. The frame 2 is somewhat expanded in the right and left directions by the press-fitting of the guide ring member 4 so that the guide ring member 4 is retained in the press-fitted condition by its repulsive forces.

The thus constructed line guide 1 for fishing rod is mounted on the fishing rod body 8 by winding a thread around the rod body 8 together with the mounting foot 3 under the condition that the fishing foot 3 is seated on the outer circumferential surface of the rod body The hole 4c of the guide ring member 4 is substantially in the form of a circular shape as viewed in the axial direction of the rod body 8. Accordingly, even if the guide ring member 4 takes a slant posture, it is possible to keep a sufficient aperture diameter needed for guiding the fishing line 10 smoothly.

Then, as mentioned above, since the frame 4 is slanted, even if the fishing line 10 is entangled around the frame 2, if the tension is applied to the fishing line 10, the portion that has been entangled is slid along the top surface of the guide ring member and the slant surface of the frame 2 so that it is pulled apart forwardly with ease.

Figure 8:
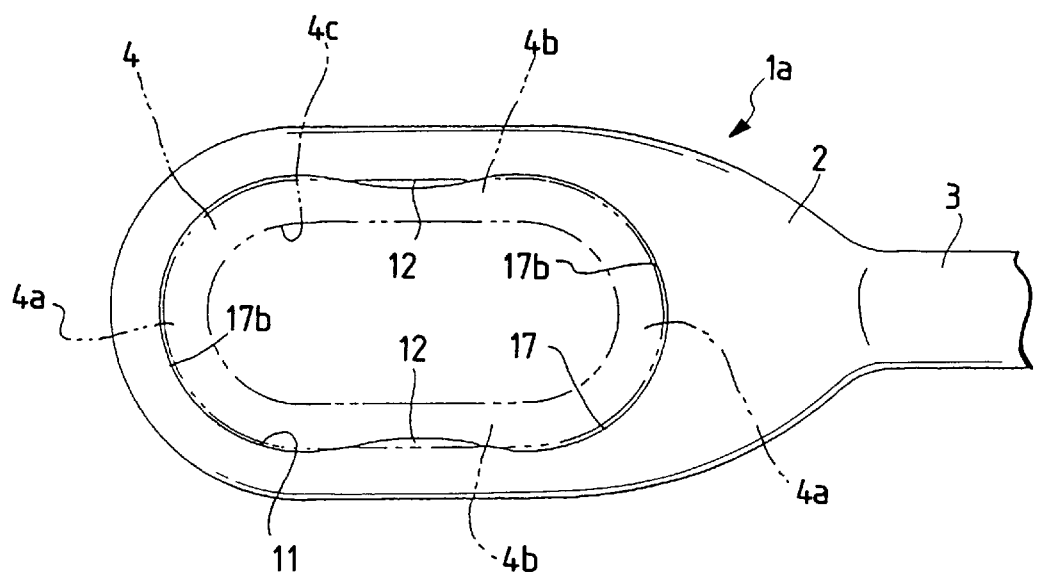
FIG. 8 is a plan view showing an important part of a modification of the line guide for the fishing rod in accordance with the second example of the invention.
Figure 9:
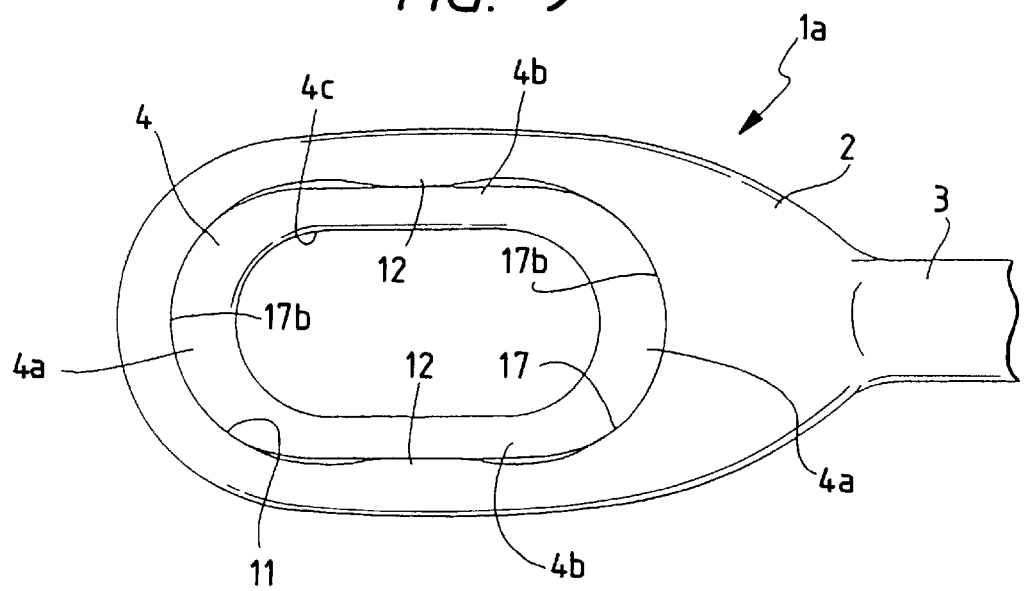
FIG. 9 is a plan view showing only an important part of the frame of the line guide shown in FIG. 8.

FIGS. 8 and 9 show modifications to the line guide for the fishing rod in accordance with the second example.

The difference between the line guide 1a shown in the modifications and the line fishing 1 described above is only the shape of the projections provided on the edge of ring mounting hole of the frame. Accordingly the following explanation will be given as to such difference. The same reference numerals are given to the like components or members of FIGS. 8 and 9 and the explanation therefor will be omitted.

Reference numeral 12 denotes projections formed on the inner circumferential edge 17 of the ring mounting hole 11. The projections 12 project from the portions other than the opposite end portions 17b having the semicircular shape of the inner circumferential edge 17, i.e., the portion corresponding to the portions 4b extending in the straight line of the guide ring member 4 and are formed to somewhat expand to form minutely gentle arcuate curves.

Accordingly, when the guide ring member 4 is press-fitted into the ring mounting hole 11, the portions of the guide ring member 4 extending in a straight line are received between the right and left projections 12 and 12 while pressing the projections 12 somewhat laterally. The projections 12 are pressed so that the width of the ring mounting hole 11 is increased. As a result, the frame 2 is somewhat deformed so that the longitudinal dimension of the ring mounting hole 11 is reduced. As a result, the opposite end portions 17b in the longitudinal direction of the inner circumferential edge 17 of the ring mounting hole 11 are brought into pressing contact with the opposite end portions of the outer circumferential surface of the guide ring member 4 in the longitudinal direction.

FIG. 9 shows a state in which the guide ring member 4 is thus inserted into the ring mounting hole 11. The frame 2 is somewhat expanded in the right and left directions by press-fitting the guide ring member 4 into the frame 2, and the guide ring member 4 is press-fitted by its repulsive forces.

The specific structure according to the second example of the invention is not limited to the structure shown above. it is possible to change the design within the scope of the spirit of the heart of the invention.

In particular, the number and the shape of the projections of the ring mounting hole is not limited to those shown in the second example. If they may be expanded in the widthwise direction while being pressed by the guide ring member, any projections may be used.

As is apparent from the foregoing description, in the line guide for the fishing rod according to the second example of the invention, when the guide ring member is press-fitted into the ring mounting hole, the portions of the guide ring member extending in a straight line presses the straight portions of the inner circumferential edge of the ring mounting hole while clamping the projection, thereby expanding the width of the ring mounting hole. As a result, the frame is deformed and the longitudinal distance of the ring mounting hole is shrunk, so that the opposite end portions in the longitudinal direction of the ring mounting hole are particularly press-fitted to the opposite end portions in the longitudinal direction of the guide ring member.

Thus, both ends in the longitudinal direction and both end at least in the widthwise direction of the guide ring member are pressed against the inner circumferential edge of the ring mounting hole to thereby retain firmly the guide ring member to the frame.

Accordingly, according to the present invention, even if it is difficult to meet the dimensional precision of the oblong guide ring member, it is possible to retain the guide ring member to the ring mounting hole.

EXAMPLE 3

FIGS. 10 to 13 show a line guide for a fishing rod according to a third example of the invention. Reference numeral 1 denotes a line guide. The line guide 1 is composed of a metal made frame 2, a metal made mounting foot 3 and a guide ring member 4 retained on the frame 2.

The guide ring member 4 is in the form of an oblong shape extending back and forth. Namely, both front and rear end portions of the guide ring member 4 are in the form of a semicircular shape, and the intermediate portion 4b extends straightly. The longitudinal dimension thereof is about 1.5 times greater than the short axial dimension.

This guide ring member 4 has a flange 5a. The guide flange 5a is formed to extend from the outer circumferential portion 5a at about half a full thickness of the guide ring member 4.

A cross section perpendicular to the circumferential direction of the guide ring member 4 (see FIGS. 12 and 13) is substantially in the form of a semi-circular shape. Its arcuate surface forms an inner circumferential surface 27 of the guide ring member 4. Then, corner portions 28 of the guide ring member 4 in the thickness direction, i.e., the corners 28 at which the outer circumferential surface 5 and the outer circumferential surface and the inner circumferential surface 27 of the flange 5a are continuous with each other form an arcuate surface having a smaller radius of curvature than that of the inner circumferential surface 27.

The guide ring member 4 is made of hard material such as ceramics.

The frame 2 and a mounting foot 3 are formed integrally with each other by pressing a metal plate. Under the condition that the mounting foot 3 is seated on the outer circumferential of the rod body (sometimes referred to as a "blank") 8, the mounting foot 3 as well as the rod body 8 is wound by a thread so that the line guide 1 is mounted on the rod body 8.

The frame 2 is formed into a substantially oblong shape extending back and forth. The outer circumferential portion except the rear end portion is bent downwardly to form a circumferential wall 20. Accordingly, the circumferential wall 20 has substantially a U-shape whose front end portion is bent in the form of an arcuate shape as viewed from the back side of the frame 2 (from the side of the rod body 8 when the frame 2 is mounted on the rod body 8). Then, intermediate portions 20a (hereinafter referred to as holding portions) extending in a straight line on both right and left sides of the circumferential wall 20 are formed into inverted trapezoidal shapes. A vertical width $W_2$ (refer to FIG. 12) of the circumferential wall 20 except for the holding portions 20a is about half the thickness $t_2$ of the guide ring member 4.

A lateral width on the inside of the circumferential wall 20 is formed to be somewhat greater than the full lateral width of the guide ring member 4.

Figure 10:
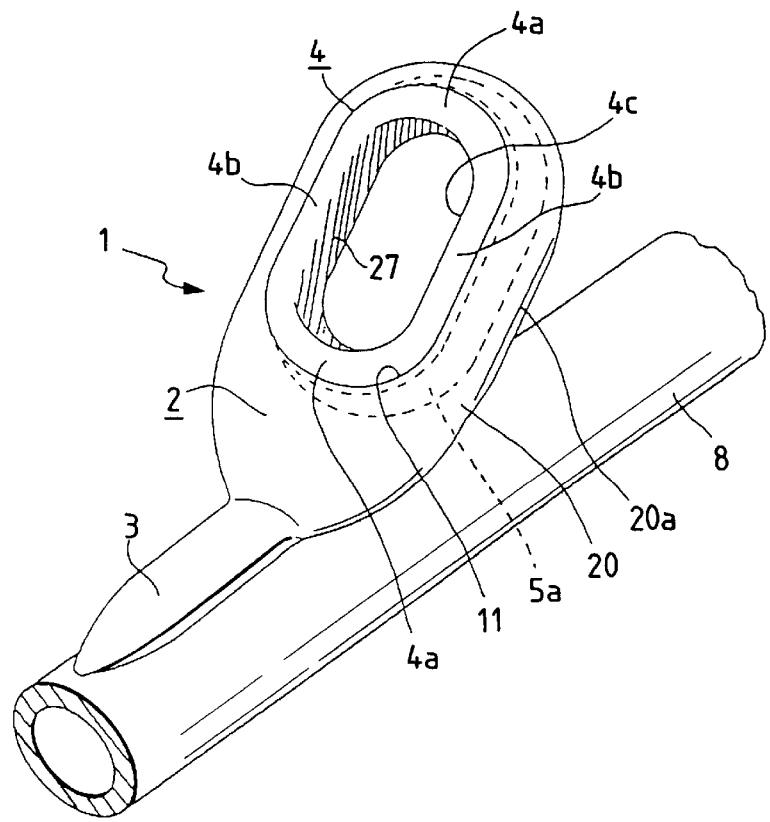
FIG. 10 is a perspective view showing a line guide for a fishing rod in accordance with a third example of the invention under the condition that it is mounted on the fishing rod.
Figure 11:
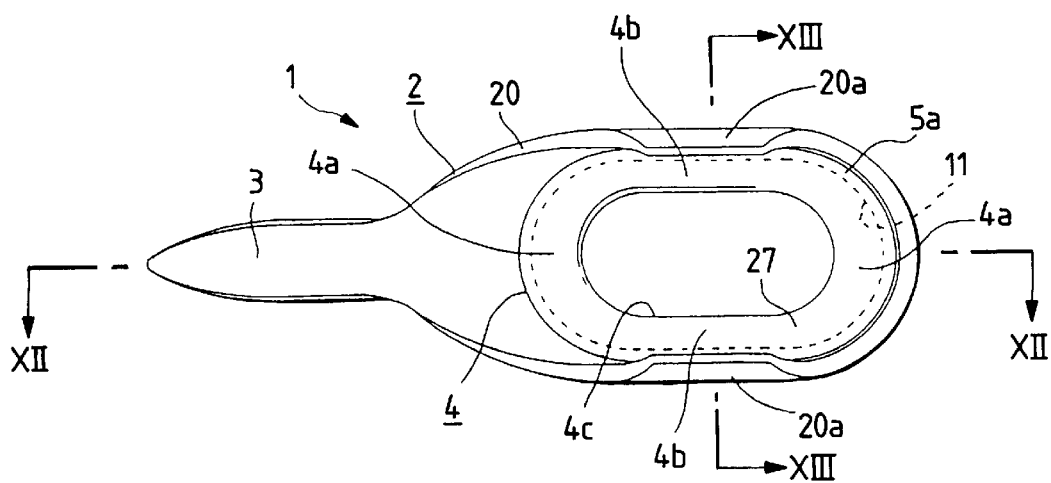
FIG. 11 is a rear view of the line guide shown in FIG. 10.
Figure 12:
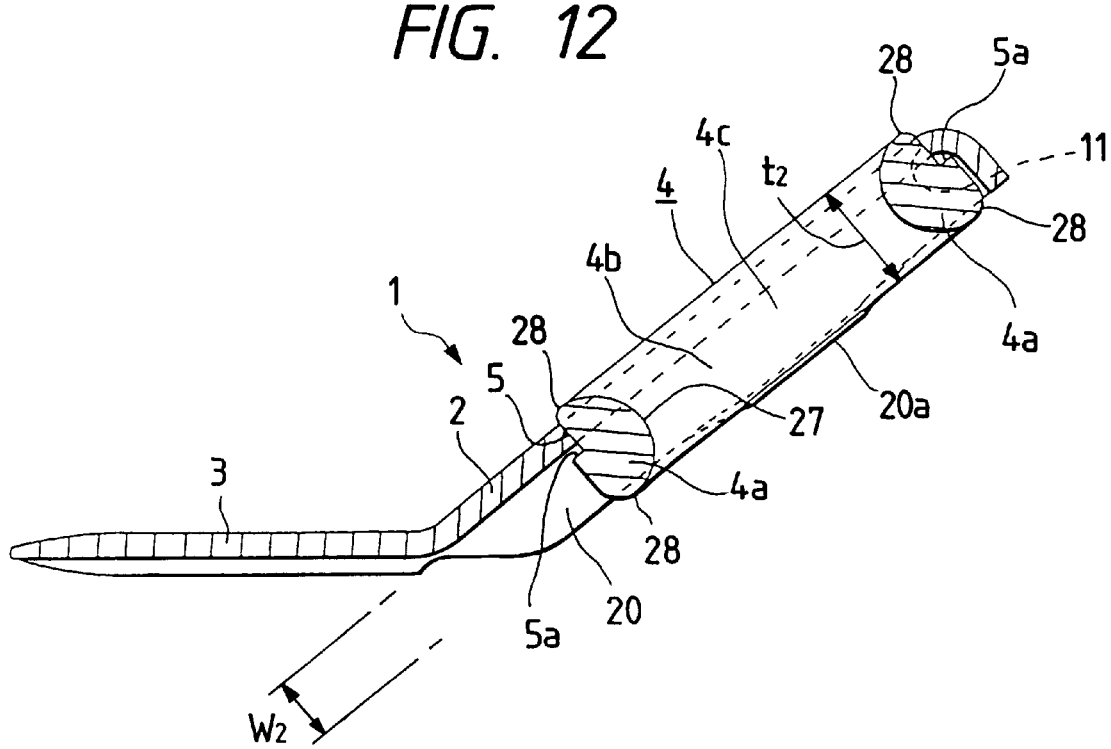
FIG. 12 is a cross-sectional view taken along the line XII—XII of FIG. 11.
Figure 13:
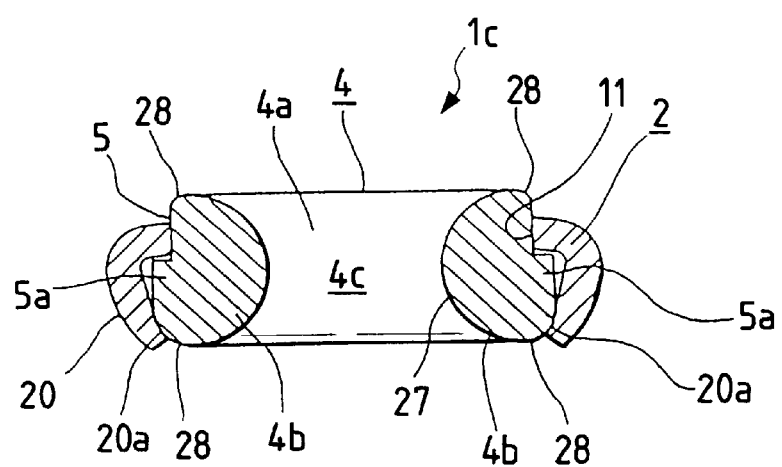
FIG. 13 is a cross-sectional view taken along the line XIII—XIII of FIG. 11.

Also, the frame 2 is tilted toward the rod tip end (in the direction upward to the right in FIG. 10). The slant angle is about 40° relative to a flat surface on which the mounting foot 3 is located.

Reference numeral 11 denotes a ring mounting hole formed in the frame 2 and having an oblong shape extending in the longitudinal direction of the frame 2.

The guide ring member 4 is fitted into this ring mounting hole 11. Namely, the flange 5a of the guide ring member 4 is engaged with the opening edge portion on the back side of the ring mounting hole 11 and the portion in which the flange 5a is not formed is press-fitted into the ring mounting hole 11, so that the guide ring member 4 is mounted on the frame 2.

Under this condition, the guide ring member 4 is positioned while remaining a slight clearance between the circumferential wall 20 and the guide ring member 4 (clearance is shown to be exaggerated in the drawing). At the same time, only a small part thereof somewhat projects on the front side from the frame 2 (on the side opposite the rod body 8 when the guide ring member 4 is mounted on the rod body 8), and almost all the remaining portion thereof is received to be hidden inside of the frame 2 and the circumferential wall 20.

Accordingly, since there is no fear that an object would be brought into direct contact with the guide ring member 4 even if the rod body 8 falls down in the horizontal position, there is a very small possibility that the guide ring member 4 would be damaged.

After the guide ring member 4 is fitted in the ring mounting hole 11, the right and left holding portions 20a of the circumferential wall 20 are bent inwardly, respectively. Then, the holding portions 20a surround the corners 28 of the guide ring member 4. The surrounding portions thereof extend up to middle portions of the corners 28. As a result, the tip ends of the holding portions 20a is located within or close to the same flat surface as the side surface on the back side of the guide ring member 4, and at least do not largely project from the side surface on the back side of the guide ring member 4 (see FIGS. 12 and 13).

The flange 5a of the guide ring member 4 is held to be clamped from both sides in the thickness direction of the guide ring member 4 by the frame 2 and the holding portions 20a.

Accordingly, even if knots of the fishing line, swivels or sinkers collides with the guide ring member 4 in any direction when the fishing line to which the caught fish load is applied is retrieved, there is no fear that the guide ring member 4 might easily be released or removed from the frame 2.

Then, since the passing direction of the fishing line which is to pass through the hole 4c of the guide ring member 4 is kept almost unchanged on the right and left directions, even if the holding portions 20 are engaged with the intermediate portions 4b on both right and left sides of the guide ring member 4, there is almost no fear that the fishing line would come into contact with the fishing line holding portions 20a.

Incidentally, an adhesive may be applied on the circumferential wall 20 and in the space between the inner circumferential surface of the ring mounting hole 11 and the outer circumferential surface 5 of the guide ring member 4. The well known adhesive may be used for the line guide. However, if an adhesive having a somewhat low viscosity is used, since the adhesive is automatically spread over the full portion of the above-described clearance when dropped at several positions, the workability is excellent.

Figure 14:
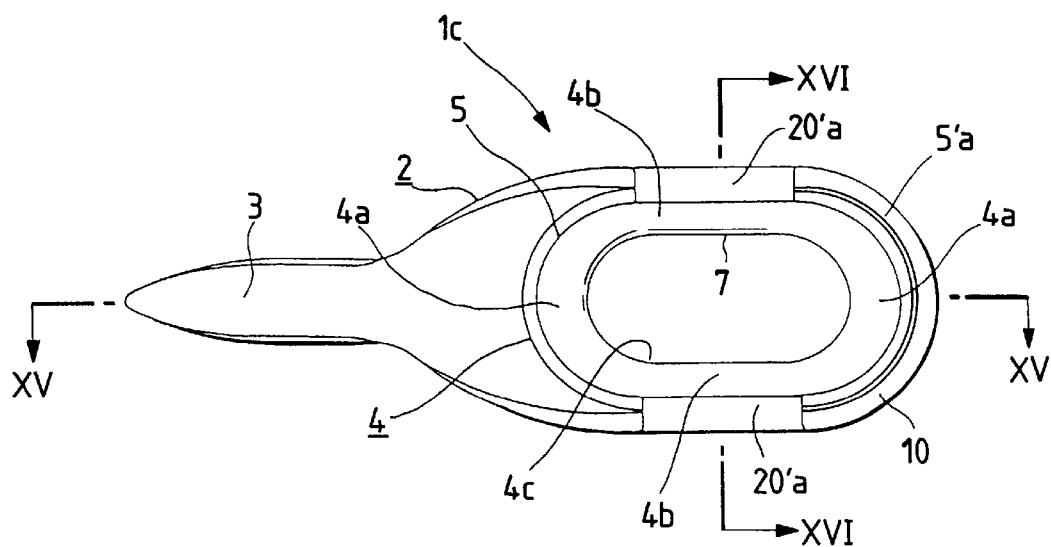
FIG. 14 is a rear view showing a modification of a line guide for a fishing rod in accordance with the third example of the invention.
Figure 15:
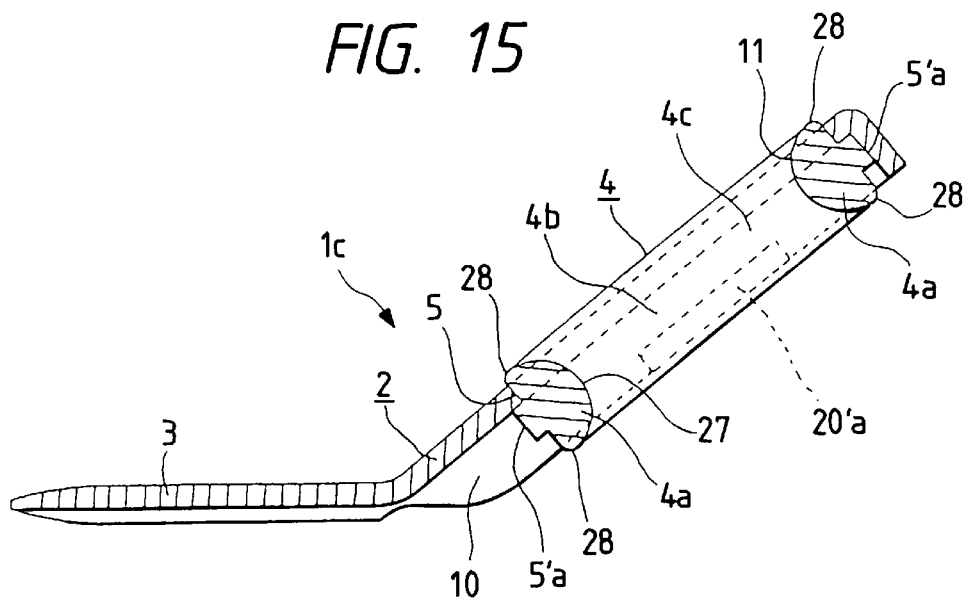
FIG. 15 is a cross-sectional view taken along the line XV—XV of FIG. 14.
Figure 16:
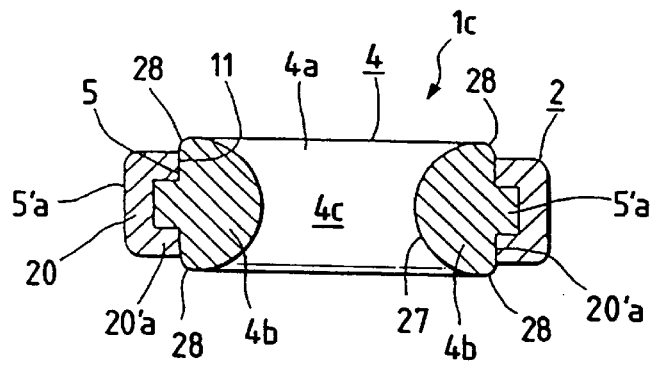
FIG. 16 is a cross-sectional view taken along the line XVI—XVI of FIG. 14.

FIGS. 14 to 16 show modifications to the modification of the line guide 1c for the fishing rod in accordance with a third example of the invention. The difference between the line guide for a fishing rod 1c shown in the modification and the line guide 1 described above is only the shape of the engagement of the holding portions of the circumferential wall with the guide ring member. Accordingly the following explanation will be given as to the difference only. The same reference numerals or those with the prime are given to the like components or members of the line guide 1 and the explanation therefor will be omitted.

The flange 5'a of the guide ring member 4 in the line guide 1c is only provided in intermediate portions in the widthwise direction of the outer circumferential surface 5 of the guide ring member 4.

Then, the holding portions 20'a that form the intermediate portions on both right and left sides of the circumferential wall 20 of the frame 2 are formed to be capable of being bent by the formation of cut grooves on both sides.

Thus, after the guide ring member 4 is fitted in the ring mounting hole 11, the holding portions 20'a are bent and engaged with the back side surfaces of the flange 5'a.

Thus, the flange 5'a of the guide ring member 4 is held to be clamped on both sides in the thickness direction of the guide ring member 4 by the frame 2 and the holding portions 20'a.

Then, since the holding portions 20'a are located at a position which is recessed from the side surfaces of the back side of the guide ring member 4, there is no fear that the fishing line to be caused to pass through the guide ring member 4 would come into contact with the guide ring member 4.

It should be understood that the third example according to the present invention is not limited to what has been described in the above but it is possible to change and choose within the scope of the spirit of the invention may be included in the present invention.

For instance, in the example, the frame is tilted and the guide ring member is oblong. However, the present invention may be applied to the frame which takes an upright posture relative to the rod body or the true circular guide ring member.

Incidentally, in the example, the line guide is mounted on a top surface of the fishing rod body. However, in the case where the line guide is mounted on the bottom surface of the fishing rod body, the invention may be applied thereto by inverting the positions of the respective parts described above.

As is apparent from the foregoing described, in the line guide according to the third example of the invention, since the flange of the guide ring member is held to be clamped on both sides in the thickness direction of the guide ring member by the frame and the part of the circumferential wall, even if the shock is applied to the guide ring member in any direction back and forth, there is no fear that the guide ring member would be removed from the frame.

Then, according to the present invention, the tip end portions on both sides of the circumferential wall are engaged with both sides of the guide ring member. Since the direction of the fishing line to be caused to pass through the guide ring member is kept almost unchanged in the right and left directions, there is no fear that the fishing line is brought into contact with the circumferential wall.

Furthermore, since almost all the guide ring member is received and hidden inside of the frame and the circumferential wall, there is no fear that the object would be brought into contact with the guide ring member even if the rod body is tilted down horizontally. It is therefore possible to prevent the damage of the guide ring member without fail.

Also, by the formation of the circumferential wall by bending the outer circumferential portions of the frame, the mechanical strength of the frame is enhanced so that it is possible to thin the thickness of the frame to decrease the weight thereof.

Also, in the modification of the third example, since the frame is tilted toward the tip end of the fishing rod and the guide ring member is oblong, it is possible to easily release the fishing line entanglement.

Then, in the oblong guide ring member, the circumferential wall is engaged with the portion extending in a straight line that may relatively easily be formed with high dimensional precision. The factor to be defined in view of the relationship with the line passing condition, such as the engagement position of the circumferential wall with the guide ring member may be realized with a high precision.

EXAMPLE 4

FIGS. 17 to 20 show a line guide for a fishing rod in accordance with a fourth example. The same reference numerals as the reference numerals in the third example are used to indicate members and components in common use.

The frame 2 has a long, substantially oblong circular shape back and forth. The outer circumferential portion other than the rear end portion is bent downwardly to form the circumferential wall 9. The up-and-down width $W_3$ (see FIG. 18) of the circumferential wall 9 is substantially half a thickness $t_3$ of the guide ring member 4 (see FIG. 18). Also, the right-and-left width $W_4$ (see FIG. 17) of a space inside the circumferential wall 9 is such that a slight clearance is given between the guide ring member 4 and the circumferential wall 9.

The circumferential wall 9 protects the guide ring member 4 and also contributes to the strength of the frame 2, particularly to the bending strength in the direction of the thickness.

Figure 17:
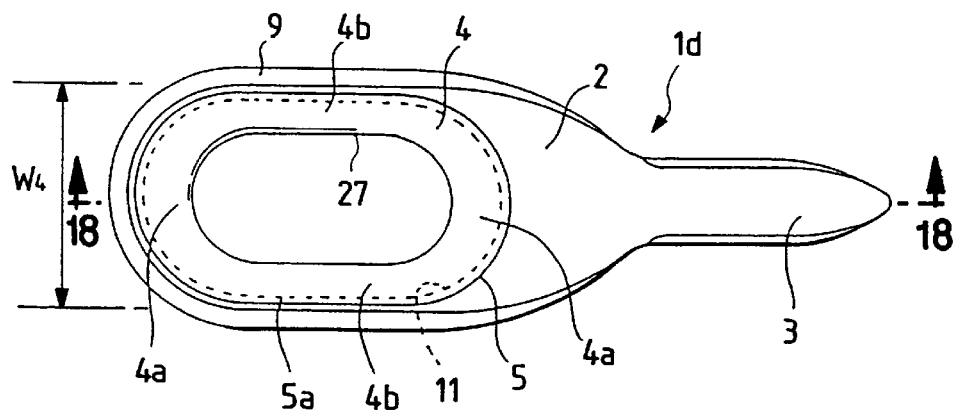
FIG. 17 is a rear view showing a line guide for fishing rod in accordance with a fourth example of the invention.
Figure 18:
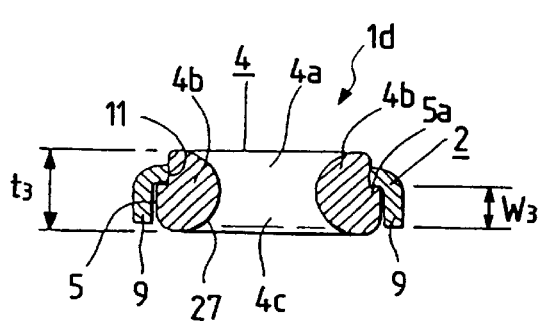
FIG. 18 is a transverse sectional view taken along the line 18—18 of FIG. 17.

Also, the frame 2 is tilted so that it is shifted toward the rod tip end (in the direction to the left in FIG. 17). The slant angle is about 40° relative to a flat surface on which the mounting foot 3 is located.

Reference numeral 11 denotes a ring mounting hole formed in the frame 2 and having an oblong shape extending in the longitudinal direction of the frame 2.

The guide ring member 4 is fitted into this ring mounting hole 11. Namely, the flange 5a of the guide ring member 4 is engaged with the opening edge portion on the front side (on the side of the circumferential wall 9) of the ring mounting hole 11 and the portion in which the flange 5a is not formed is press-fitted into the ring mounting hole 11, so that the guide ring member 4 is mounted on the frame 2.

Under this condition, only a small part of the guide ring member 4 in the thickness direction projects on the top side from the frame 2, and almost all the remaining portion thereof is received to be hidden inside of the frame 2 and the circumferential wall 9.

Accordingly, since there is no fear that an object would be brought into direct contact with the guide ring member 4 even if the rod body 8 falls down in the horizontal position, there is a very small possibility that the guide ring member 4 would be damaged.

After the guide ring member 4 is engaged with the frame 2, an adhesive may be applied on the circumferential wall 9 and in the space between the inner circumferential surface of the ring mounting hole 11 and the outer circumferential surface 5 of the guide ring member 4. The known adhesive may be used for the line guide. However, if an adhesive having a somewhat low viscosity is used, since the adhesive is automatically spread over the full portion of the above-described clearance only by dropping it at several positions, the workability is excellent.

Thus, almost all the outer circumferential surface 5 of the guide ring member 4 is adhered to the frame 2.

Accordingly, the mounting of the guide ring member 4 onto the frame 2 is performed by the two fixing means, i.e., that almost half the guide ring member 4 in the thickness direction is press-fitted into the ring mounting hole 11 and that almost all the outer circumferential surface 5 of the guide ring member 4 is adhered to the frame 2. Thus, the mounted condition thereof is very stabilized.

In the thus constructed line guide 1d for a fishing rod, since the flange 5a of the guide ring member 4 is engaged with the frame 2 from the front side, even if knots of the fishing line, swivels or sinkers collide with the guide ring member 4 in any direction when the fishing line to which the load of the fish catch is applied is retrieved, there is no fear that the guide ring member 4 might be released or removed from the frame 2.

Also, since the guide ring member 4 is firmly held on the frame 2 by the adhesion with a wide area and the press-fitting, there is no fear that the guide ring member 4 might easily be removed by the shock applied from the rear side.

Figure 19:
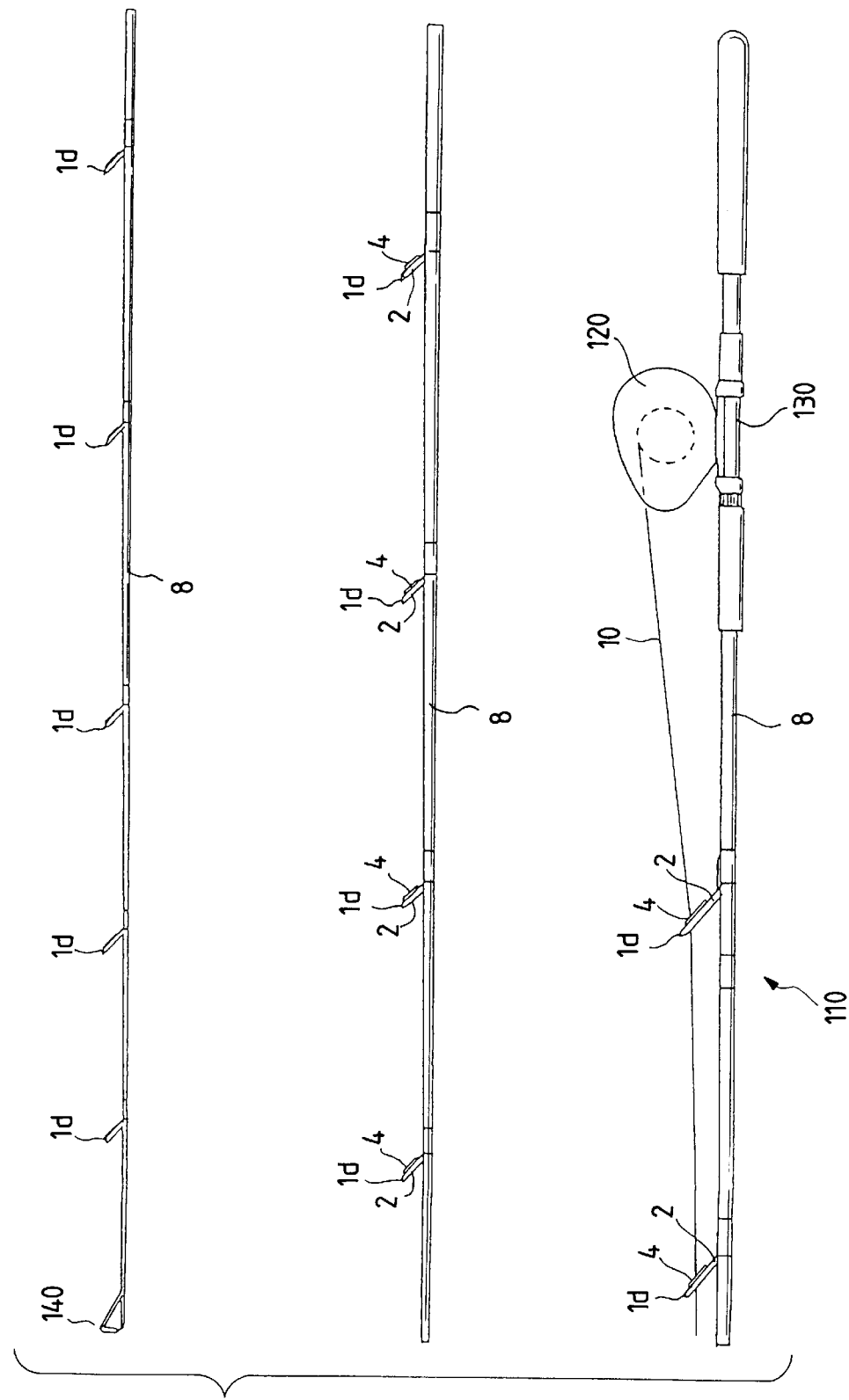
FIG. 19 is a side elevational view showing one example of a joint rod on which the fishing line guide shown in FIG. 17 is mounted.

FIG. 19 shows an example of a joint rod 110 in which the above-described line guides 1 for a fishing rod are used for all the line guides. Reference numeral 120 denotes a reel mounted on a reel seat 130. Reference numeral 140 denotes a top guide. The fishing line 10 fed from the reel 12 is caused to pass through the guide ring members 4 of the line guides 1d, 1d, ...

The hole 4c of each guide ring member 4 forms substantially a circular shape as viewed in the axial direction of the fishing rod 8. Accordingly, even if the guide ring member 4 is provided in the slant posture, it is possible to maintain an aperture diameter needed for smoothly guiding the fishing line 10.

Then, since the frame 2 is largely tilted toward the tip end of the fishing rod, even if the fishing line 10 is entangled around the frame 2, if the tension is applied to the fishing line 10, the entangled portion is slid along the slant surface of the frame 2 and passes forwardly with ease.

Figure 20:
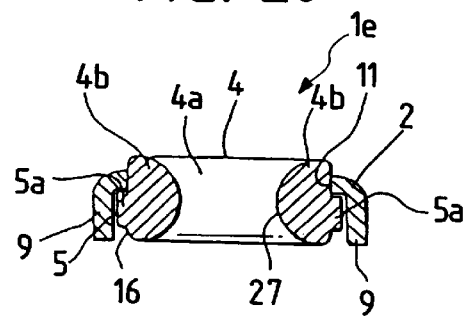
FIG. 20 is a transverse sectional view showing modification of the line guide shown in FIG. 18.

FIG. 20 shows a modification 1e of the above-described line guide 1d.

In the line guide 1e, a notched portion 16 is formed on the outer circumferential surface 5 of the guide ring member 4. This notched portion 16 is formed in an endless manner around the front end portion of the outer circumferential surface 5. Under the condition that the guide ring member 4 is mounted on the frame 2, the notched portion 16 serves as a groove extending along the inner surface of the circumferential wall 9.

Accordingly, a large amount of adhesive may be retained in the notched portion 16. With the large amount of adhesive, it is possible to firmly fix the guide ring member 4 and the frame 2 to each other.

It should be understood that the specific structure of the fourth example of present invention is not limited to what has been described above but it is possible to change and choose within the scope of the spirit of the invention may be included in the present invention.

For instance, in the example, the frame is tilted and the guide ring member is oblong. However, the present invention may be applied to the frame which takes an upright posture relative to the rod body or applied to the true circular guide ring member.

Also, in the example, the mounting portion which is composed of a single foot is used. It is possible to use a mounting portion that has front and rear mounting feet or a pipe-like mounting portion.

Incidentally, in the foregoing example, in general, the line guide which is suitable to a fishing rod using a bait type reel is exemplified. However, the present invention may also be applied to the line guide for a spinning reel. In this case, the invention may equally be applied only by inverting the positional relationship upside down.

In the thus constructed line guide for a fishing rod according to the fourth example of the invention, since the flange of the guide ring member is engaged with the frame from the front side, even if the knot of the fishing line, swivels or sinkers collide with the guide ring member in any direction when the fishing line to which the taught fish load is applied is retrieved, there is no fear that the guide ring member might be released or removed from the frame.

Also, since the guide ring member is firmly held on the frame by the the press-fitting to the ring mounting hole and by adhesion with a wide area to the circumferential wall, there is no fear that the guide ring member might easily be removed by the shock applied from the rear side.

Furthermore, since almost all the guide ring member is received to be hidden inside of the frame and the circumferential wall, there is no fear that the object would be brought into contact with the guide ring member even if the rod body is tilted down horizontally. It is therefore possible to prevent the substantial damage of the guide ring member.

Also, by the formation of the circumferential wall by bending the outer circumferential portions of the frame, the mechanical strength of the frame is enhanced so that it is possible to thin the thickness of the frame to reduce the weight thereof.

Furthermore, an oblong shape is adopted for the guide ring member and at the same time, the right and left width of the inside space of the circumferential wall of the frame is substantially equal to the full right and left width of the guide ring member, i.e., the width for which it is relatively easy to realize the dimensional precision in the oblong guide ring member. Accordingly, although the guide ring member is oblong, it is possible to give the clearance between the guide ring member and the frame with a high precision. Thus, it is possible to adhere the guide ring member and the frame to each other.

Also, since the frame is tilted toward the tip end of the fishing rod, it is easy to release the fishing line entanglement.

EXAMPLE 5

FIGS. 21 to 25 show a line guide for a fishing rod according to a fifth example of the invention. Reference numeral 1 denotes a line guide. The line guide 1 is composed of a metal made frame 2, a metal made mounting foot 3 and a guide ring member 4 retained on the frame 2.

The guide ring member 4 is made of hard material such as ceramics and is in the form of an oblong shape extending back and forth. Namely, both front and rear end portions 4a of the guide ring member 4 are in the form of a semicircular shape, and the intermediate portion 4b extends straightly.

Figure 25:
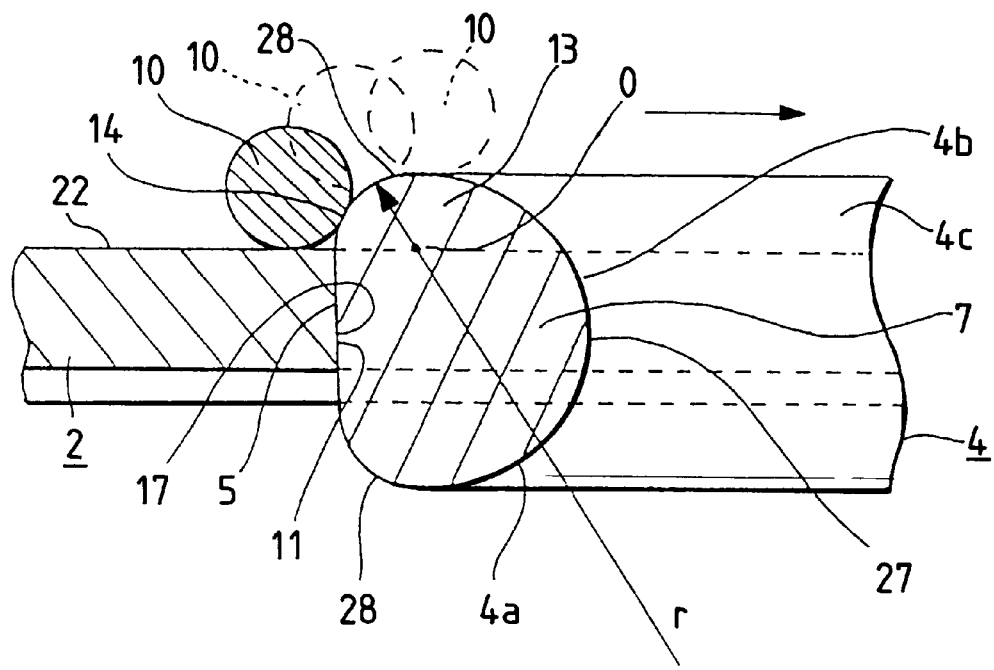
FIG. 25 is a cross-sectional view showing an important part of the guide ring member shown in FIG. 21.

Also, the cross section 7 (mainly see FIG. 25) perpendicular to the rotation direction in which the loop of the guide ring member 4 extends is substantially in the form of a semi-circular shape in any position. The corners 28 at which the linear extending outer circumferential surface 5 out of the contour of the cross section 7 and the inner circumferential surface 27 having a large radius of curvature are continuous with each other form an arcuate surface having a radius of curvature r (FIG. 25).

The frame 2 and a mounting foot 3 are formed integrally with each other by pressing a metal plate. Under the condition that the mounting foot 3 is seated on the outer circumferential surface of a rod body 8 (sometimes referred to as a "blank"), a thread is wound around the mounting foot so that the line guide 1f is mounted on the rod body 8.

The frame 2 is substantially in the form of an oblong plate-like shape extending back and forth. As is apparent from FIG. 22, the frame 2 as a whole is gently curved so as to close to the rod body 8 toward right and left end sides. Accordingly, the intermediate portions on the right and left of the frame 2 are kept at the highest level to form a ridge 22. The above-described curvature of the frame 2 is not defined numerically and not limited in a general form but in this example, $R_0=15$ mm.

Also, the frame 2 is tilted so that it is shifted toward the rod tip end (in the direction from left to right upward in FIG. 1). The slant angle is about 40° relative to a flat surface on which the mounting foot 3 is located.

The hole 4c of the guide ring member 4 is substantially in the form of a circle as viewed in the axial direction of the rod body 8. Accordingly, even if the guide ring member 4 takes a slant posture, it is possible to keep a sufficient aperture diameter needed for guiding the fishing line 10 smoothly.

Reference numeral 11 denotes a ring mounting hole formed in the frame 2 and having an oblong shape extending in the longitudinal direction of the frame 2. Its intermediate portions in the width direction are located at the identical position with those of the intermediate portions in the width direction of the frame 2.

The guide ring member 4 is fitted into this ring mounting hole 11. Namely, under the condition that the outer circumferential surface 5 of the guide ring member 4 is in contact with the inner circumferential edge 17 of the ring mounting hole 11, the guide ring member 4 is received in the ring mounting hole 11. In this case, since the frame 2 is curved as mentioned above, the portion 13 on the longitudinal axis of the guide ring member 4 corresponds to the ridge 22 of the frame 2. The center O (see FIG. 25) of the radius r of the corner 28 on the upper side of the portion 13 is located on an extension line of the ridge 22.

Accordingly, the surface 14 follows the ridge 22 of the frame 2 out of the portion projecting from the frame 2 of the guide ring member 4 is formed into an arcuate surface including an upward component.

Figure 21:
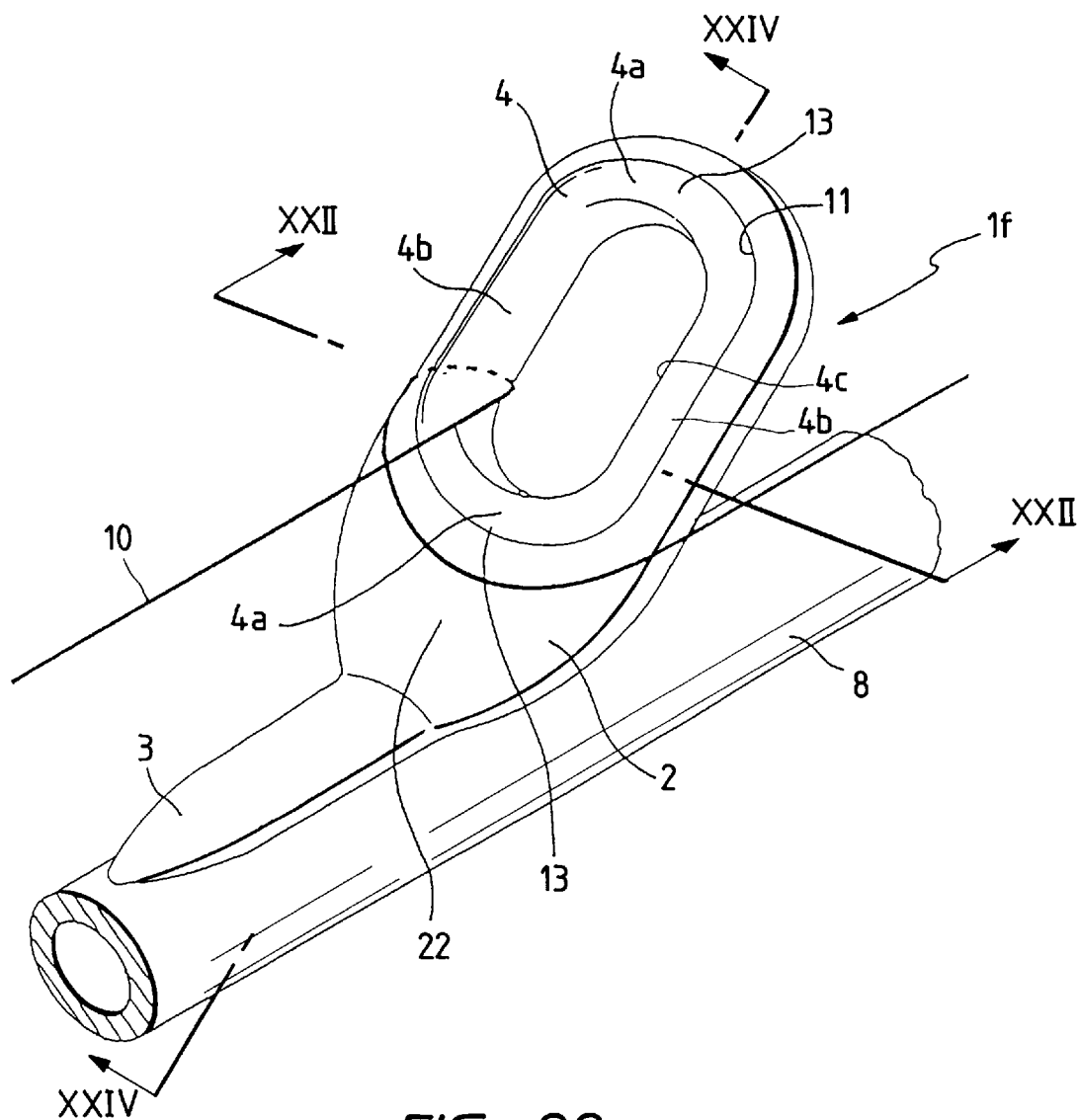
FIG. 21 is an overall perspective view showing a line guide for a fishing rod in accordance with a fifth example of the invention under the condition that it is mounted on the fishing rod.
Figure 22:
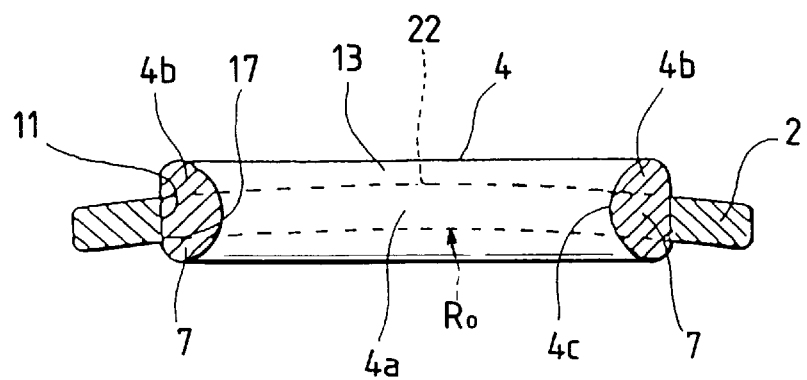
FIG. 22 is an enlarged sectional view taken along the line XXII—XXII of FIG. 21.
Figure 23:
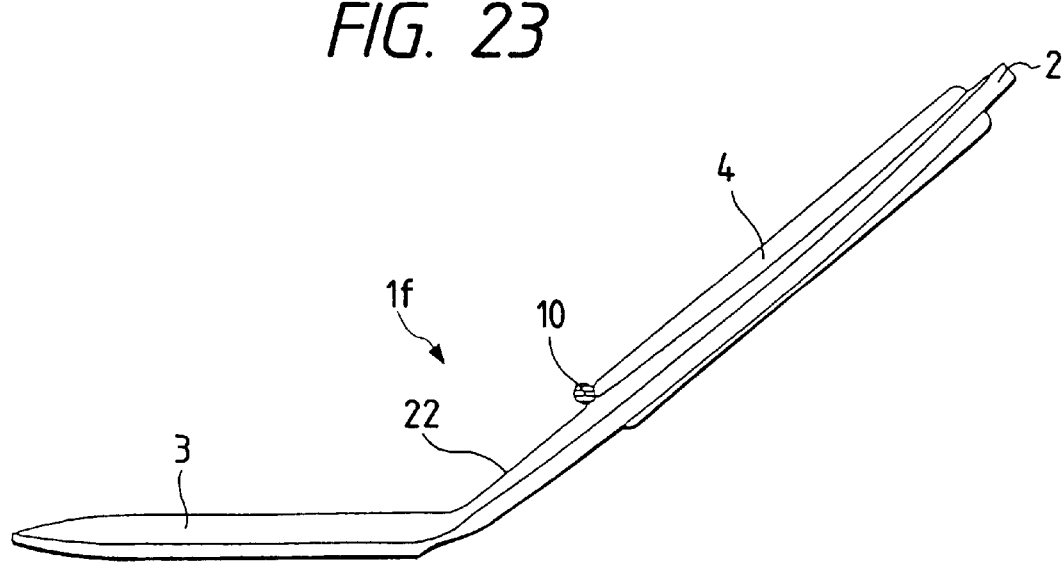
FIG. 23 is a side elevational view of the fishing line guide shown in FIG. 21.
Figure 24:
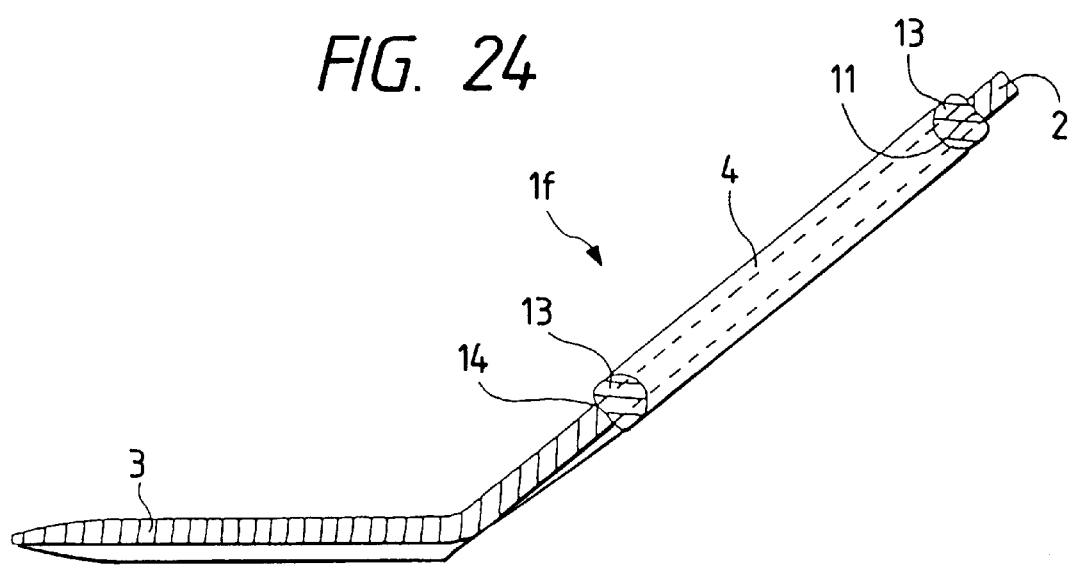
FIG. 24 is a cross-sectional view taken along the line XXIV—XXIV of FIG. 21.

Thus, the line guide 1f is thus formed. As shown in FIG. 21, even if the fishing line 10 is entangled to surround the frame 2, if the tension is applied to the fishing line 10, it is possible to easily released the fishing line entanglement. Namely, if the tension is applied to the fishing line 10, the portion wound around the frame 2 slides forwardly along the top surface of the frame. When it is brought into contact with the guide ring member 4, the fishing line rides over the surface 14 following the ridge 22 to ride over the upper surface of the guide ring member 4.

Figure 26:
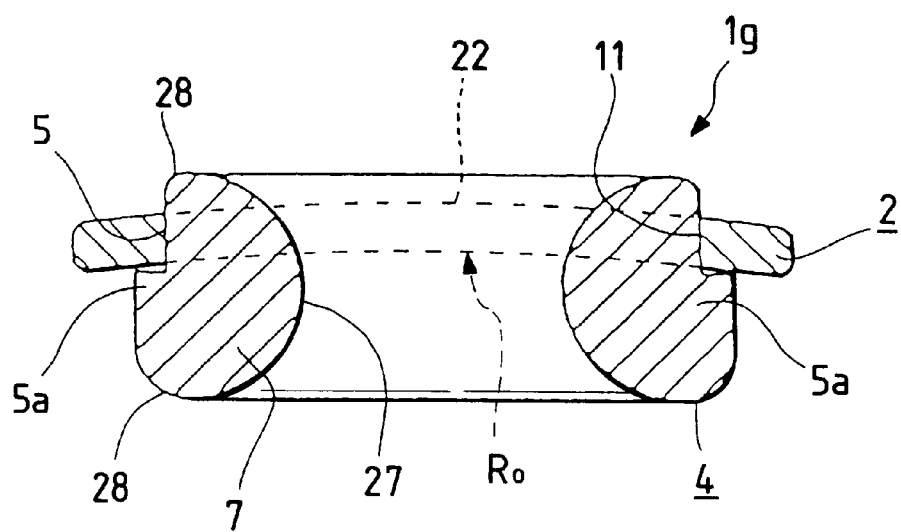
FIG. 26 is a cross-sectional view showing an important part of a modification of a fishing line guide in accordance with the fifth example of the invention.

FIG. 26 shows a first modification of the line guide 1g for a fishing rod according to the fifth example of the invention.

The difference between the line guide 1g shown in the first modifications and the line guide 1f described above is only that the guide ring member has a flange. Accordingly the following explanation will be given as to the difference. The same reference numerals are given to components or members in common use of FIG. 26 and the explanation therefor will be omitted.

In the same way, the reference numerals will be given also in the second and third modifications to be described later.

Reference numeral 5a denotes the flange of the guide ring member 4. Under the flange 5a is engaged with the opening edge portion on the back side of the mounting hole 11, the guide ring member 4 is mounted on the frame 2. Accordingly, even if a strong shock is applied from the front side to the guide ring member 4, there is no fear that the guide ring member 4 would be removed from the frame 2.

Figure 27:
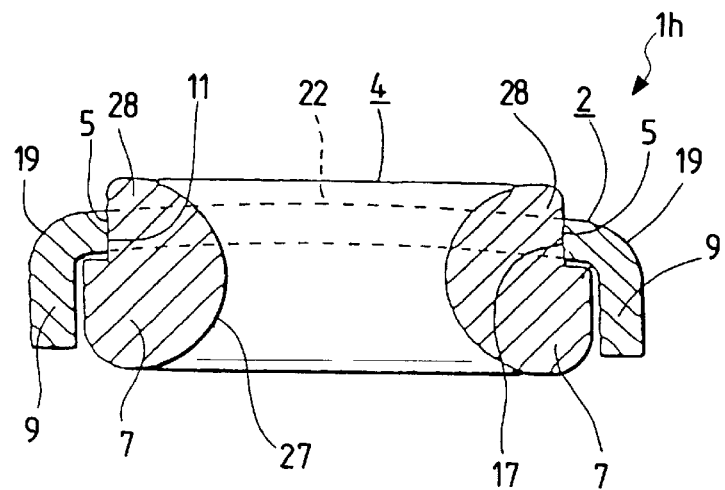
FIG. 27 is a cross-sectional view showing an important part of another modification of a fishing line guide in accordance with the fifth example of the invention.

FIG. 27 shows a second modification of the line guide 1h for a fishing rod according to the fifth example in the invention.

The difference between the line guide 1h shown of the modifications and the line guide 1g described above is only that the circumferential wall is provided on the frame 2.

Reference numeral 9 denotes a circumferential wall formed by bending the outer circumferential portion other than the rear end portion of the frame 2 downwardly. A shoulder portion 19 at which the circumferential wall 9 of the frame 2 and the other portion are continuous with each other provides a round portion when the circumferential wall 9 is bent and formed.

Accordingly, there is no fear that the edge of the tip end of the frame 2 edges into the fishing line 10 wound around the frame 2. The slippage of the fishing line 10 is improved.

Figure 28:
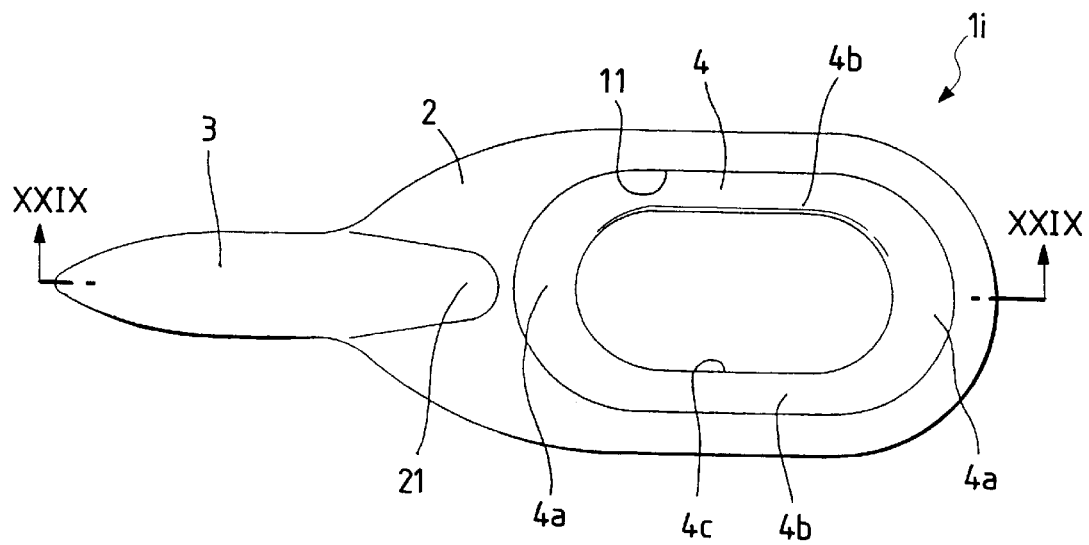
FIG. 28 is a plan view showing still another modification of a fishing line guide in accordance with the fifth example of the invention.
Figure 29:
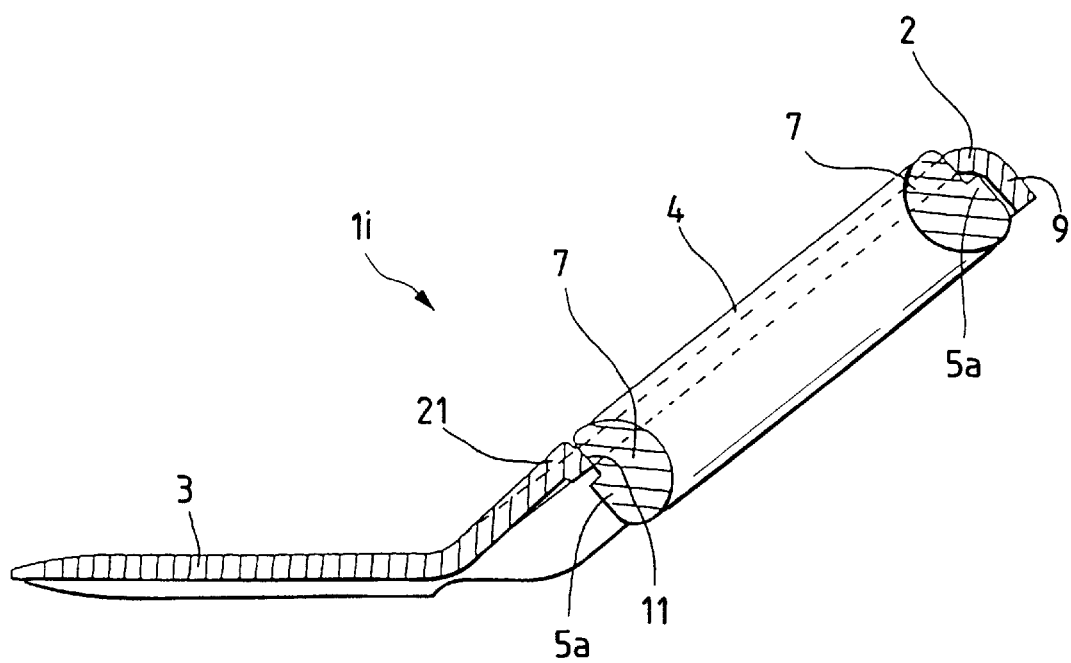
FIG. 29 is a cross-sectional view taken along the line XXIX—XXIX of FIG. 28.
Figure 30:
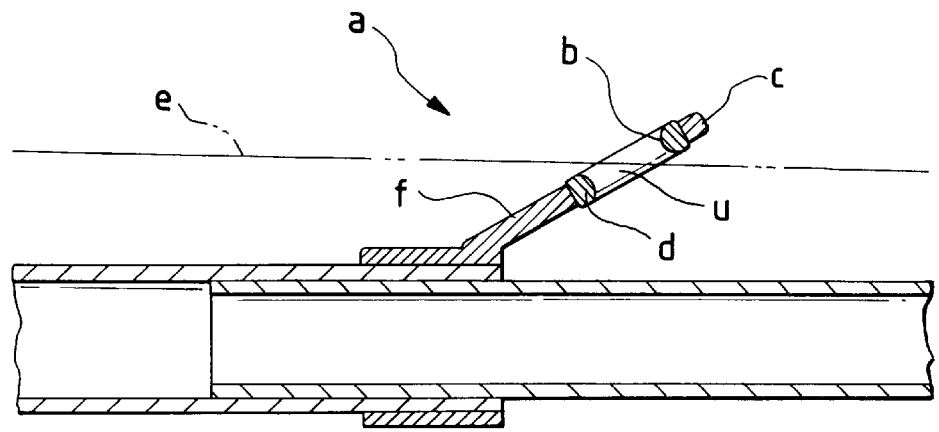
FIG. 30 is a vertical sectional view showing one example of a conventional line guide for a fishing rod using an oblong guide ring member.
Figure 31:
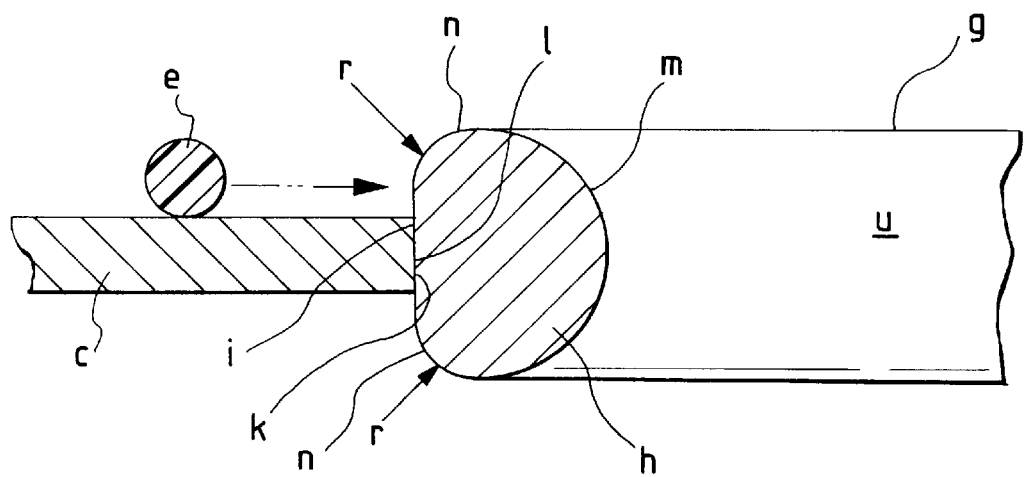
FIG. 31 is a view showing a cross-sectional shape perpendicular to a circumferential direction of a conventional guide ring member.
Figure 32:
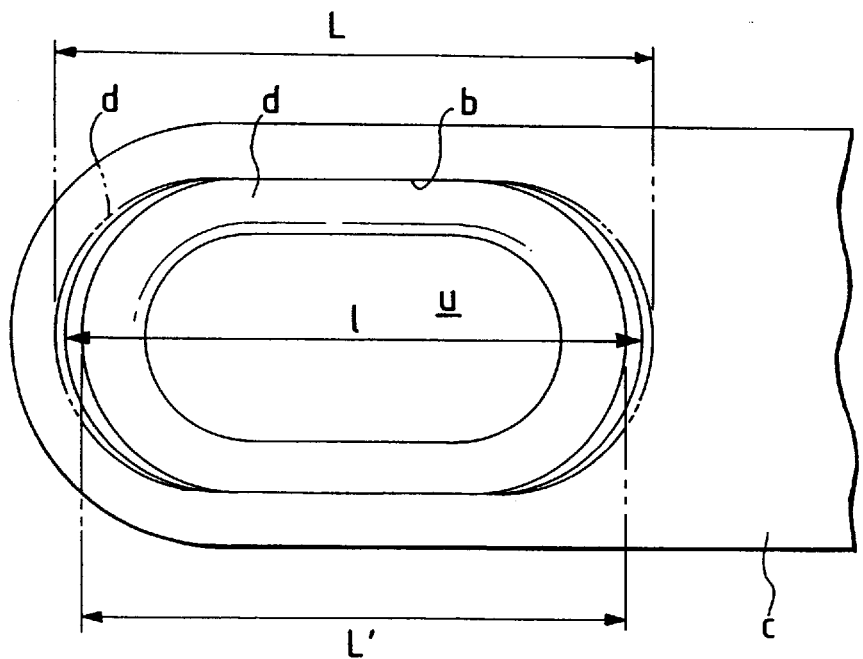
FIG. 32 is a view illustrative of a problem on a dimensional precision of a conventional oblong guide ring member.
Figure 33:
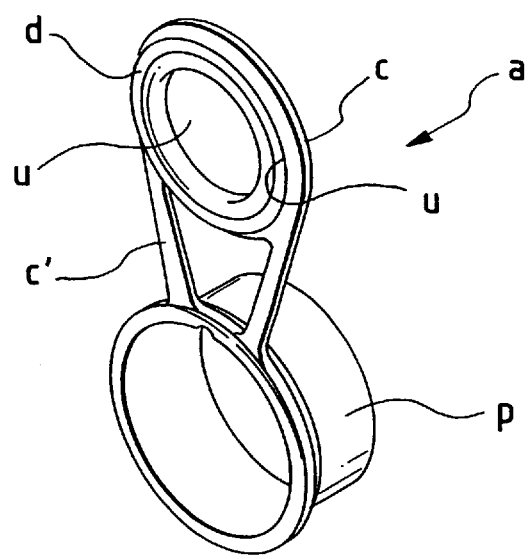
FIG. 33 is a perspective view showing an example of a conventional line guide for a fishing rod.

FIG. 28 and FIG. 29 show a third modification of the line guide 1i for a fishing rod according to the fifth example of the invention.

The difference between the line guide 1i shown in the modifications and the line guides 1f, 1g, and 1h described above is only that the projection is formed on the frame 2.

Reference numeral 21 denotes a projection formed on the frame 2. The projection 21 is formed by pressing upwardly the intermediate portion on the right an left direction of the rear portion from the ring mounting hole 11 of the frame 2. Then, height of the projection 2 is increased forwardly and its front end has substantially the same height as that of the upper surface of the guide ring member 4.

Accordingly, when the tension is applied to the fishing line in the condition that the fishing line 10 is wound around the frame 2, the portion wound around the frame 2 slides forwardly along the top surface of the frame 2, and the portion riding on the projection 21 rides over the upper surface of the guide ring member 4 smoothly.

Although the fifth example of the invention has been described as above, it should be understood that the specific structure of the present invention is not limited to what has been described in the example but it is possible to change and choose within the scope of the spirit of the invention may be included in the present invention.

In particular, in the example, the center of the arcuate of the corner opposite to the frame curvature direction at the end portion on the mounting portion of the guide ring member is located on the extension line of the curvature apex of the frame. However, the height of this position is not always exactly identical with that of the curvature apex. This may be close to the curvature apex.

In the example, the frame is largely tilted to the end side of a fishing rod and the guide ring member is oblong. However, the present invention may be applied to the frame which takes an upright posture relative to the rod body or the guide ring member may be applied to the true circular guide ring member.

In the line guide for a fishing rod in accordance with the fifth example, since the arcuate center of the corner of the cross section in the rotation direction of the guide ring member is located in the vicinity of the curvature apex of the frame, the intermediate portion in the right and left direction of the portion of the guide ring member projecting from the frame becomes the surface including the upward component.

Accordingly, when the tension is applied to the fishing line in the condition that the fishing line is wound around the frame, the portion wound around the frame is moved mainly in contact with the curvature apex portion of the frame and rides over smoothly in contact with the end arcuate surface of the end portion of the guide ring member to ride over the guide ring member without any difficulty. Since the fishing line entangled around the frame ride over the guide ring member without any difficulty, it is easy to eliminate the fishing line entanglement.

Other Examples

According to the present invention, it is possible to combine at least one of the second through fifth examples with the first example as the basic structure. The further explanation thereof will be omitted for the purpose of avoiding duplication.

Various details of the invention may be changed without departing from its spirit nor its scope. Furthermore, the foregoing description of the examples according to the present invention is provided for the purpose of illustration only, and not for the purpose of limiting the invention as defined by the appended claims and their equivalents.

What is claimed is:

1. A line guide for a fishing rod, comprising a frame having a mounting portion adapted to be mounted on the fishing rod such that said frame is tilted toward a tip end of the fishing rod, and a ring mounting hole; and a guide ring member engaged with said ring mounting hole and having an oblong shape with a pair of opposed side portions having a width and a pair of opposed end portions having a width, the width of said side portions being smaller than the width of said end portions, said guide ring member having at least one projection extending inwardly from an inner circumferential edge of said ring mounting hole, and wherein said guide ring member is press-fitted in said ring mounting hole.

2. A line guide for a fishing rod, comprising a frame having a mounting portion adapted to be mounted on the fishing rod such that said frame is tilted toward a tip end of the fishing rod, and a ring mounting hole; and a guide ring member engaged with said ring mounting hole and having an oblong shape with a pair of opposed side portions having a width and a pair of opposed end portions having a width, the width of said side portions being smaller than the width of said end portions, wherein a circumferential wall is formed by bending forwardly an outer circumferential portion of said frame; said guide ring member has a flange extending along an outer circumferential surface, the flange of said guide ring member is engaged with an opening edge portion on a front side of the ring mounting hole, a rear portion of said guide ring member is press-fitted from a rear portion of said flange, and end portions of both side portions on the right and left of the circumferential wall are engaged with both side portions on the right and left of said guide ring member.

3. A line guide for a fishing rod, comprising a frame having a mounting portion adapted to be mounted on the fishing rod such that said frame is tilted toward a tip end of the fishing rod, and a ring mounting hole; and a guide ring member engaged with said ring mounting hole and having an oblong shape with a pair of opposed side portions having a width and a pair of opposed end portions having a width, the width of said side portions being smaller than the width of said end portions, wherein a circumferential wall is formed by bending forwardly an outer circumferential portion of said frame; said guide ring member has a flange extending along an outer circumferential surface, the flange of said guide ring member is engaged with an opening edge portion on a front side of the ring mounting hole, a rear portion of said guide ring member is engaged from a rear portion of said flange, and an adhesive is applied between said circumferential wall and said guide ring member.

4. The line guide according to claim 3, wherein a distance between inner edges of the circumferential wall is substantially the same as a distance between outer edges of said guide ring member.

5. A line guide for a fishing rod, comprising a frame having a mounting portion adapted to be mounted on the fishing rod such that said frame is tilted toward a tip end of the fishing rod, and a ring mounting hole; and a guide ring member engaged with said ring mounting hole and having an oblong shape with a pair of opposed side portions having a width and a pair of opposed end portions having a width, the width of said side portions being smaller than the width of said end portions, wherein said guide ring member has an inner circumferential surface and an outer circumferential surface, said inner circumferential surface being substantially semi-circular in shape, said outer circumferential surface being essentially linear, portions of said outer circumferential surface are in contact with an inner circumferential edge of the ring mounting hole, and corners at which the outer circumferential surface and the inner circumferential surface meet are substantially arcuate in shape, wherein said frame is inwardly bent on a central axis in the longitudinal direction, said guide ring member in which each corner adjacent to the frame is formed as a circular arc depicted around a center on a straight line extending from a face of the frame.

6. A line guide for a fishing rod, comprising a frame having a mounting portion adapted to be mounted on the fishing rod such that said frame is tilted toward a tip end of the fishing rod, and a ring mounting hole; and a guide ring member engaged with said ring mounting hole and having an oblong shape with a pair of opposed side portions having a width and a pair of opposed end portions having a width, the width of said side portions being smaller than the width of said end portions, wherein said mounting portion has a mounting leg and said guide ring member has an inner circumferential surface and an outer circumferential surface, said inner circumferential surface being substantially semi-circular in shape, said outer circumferential surface being essentially linear, portions of said outer circumferential surface are in contact with an inner circumferential edge of the ring mounting hole, and corners at which the outer circumferential surface and the inner circumferential surface meet are substantially arcuate in shape, wherein a bump is formed on said frame by pressing a portion between the mounting leg and the ring mounting hole, and said bump has a height substantially equal to that of said guide ring.

* * * * *